(12) United States Patent  
Koh et al.

(10) Patent No.: US 8,706,964 B1  
(45) Date of Patent: Apr. 22, 2014

(54) AUTOMATIC GENERATION OF CACHE-OPTIMIZED CODE

(75) Inventors: David Koh, Boston, MA (US); Murat Belge, Chelmsford, MA (US)

(73) Assignee: The Mathworks, Inc., Natick, MA (US)

( * ) Notice: Subject to any disclaimer, the term of this patent is extended or adjusted under 35 U.S.C. 154(b) by 667 days.

(21) Appl. No.: 11/864,578

(22) Filed: Sep. 28, 2007

(51) Int. Cl.
*G06F 12/00* (2006.01)

(52) U.S. Cl.
USPC .......................................................... 711/118

(58) Field of Classification Search
USPC .......................................................... 711/118
See application file for complete search history.

(56) References Cited

U.S. PATENT DOCUMENTS

| | | | |
|---|---|---|---|
| 7,389,386 B2 * | 6/2008 | Crick et al. | 711/137 |
| 2003/0145307 A1 * | 7/2003 | Jahnke | 717/106 |
| 2006/0190924 A1 * | 8/2006 | Bruening et al. | 717/104 |
| 2006/0212440 A1 * | 9/2006 | Heishi et al. | 707/4 |
| 2006/0271745 A1 * | 11/2006 | Vaidya et al. | 711/145 |
| 2008/0320235 A1 * | 12/2008 | Beckmann et al. | 711/144 |

* cited by examiner

*Primary Examiner* — Mardochee Chery
(74) *Attorney, Agent, or Firm* — Harrity & Harrity, LLP

(57) ABSTRACT

A system receives cache conditions and software information related to a software application, and automatically generates an optimal cache management scheme for the software application based on the received cache conditions and software information.

22 Claims, 25 Drawing Sheets

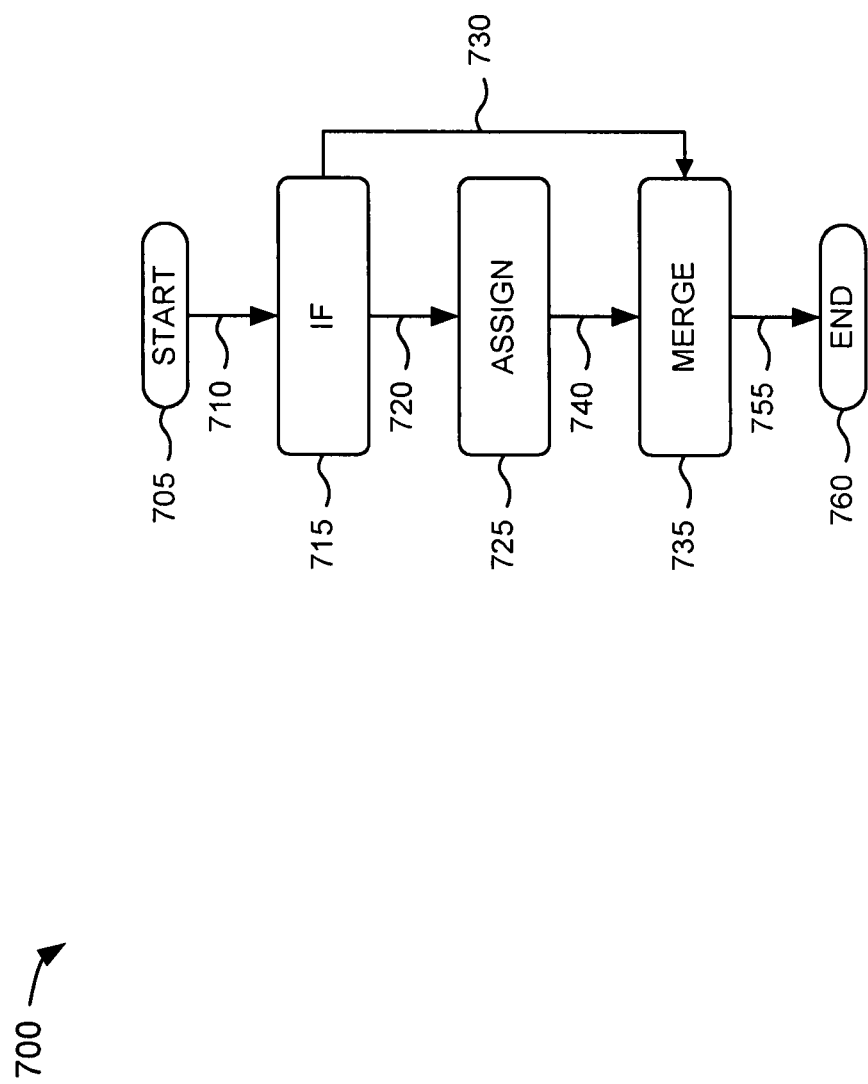

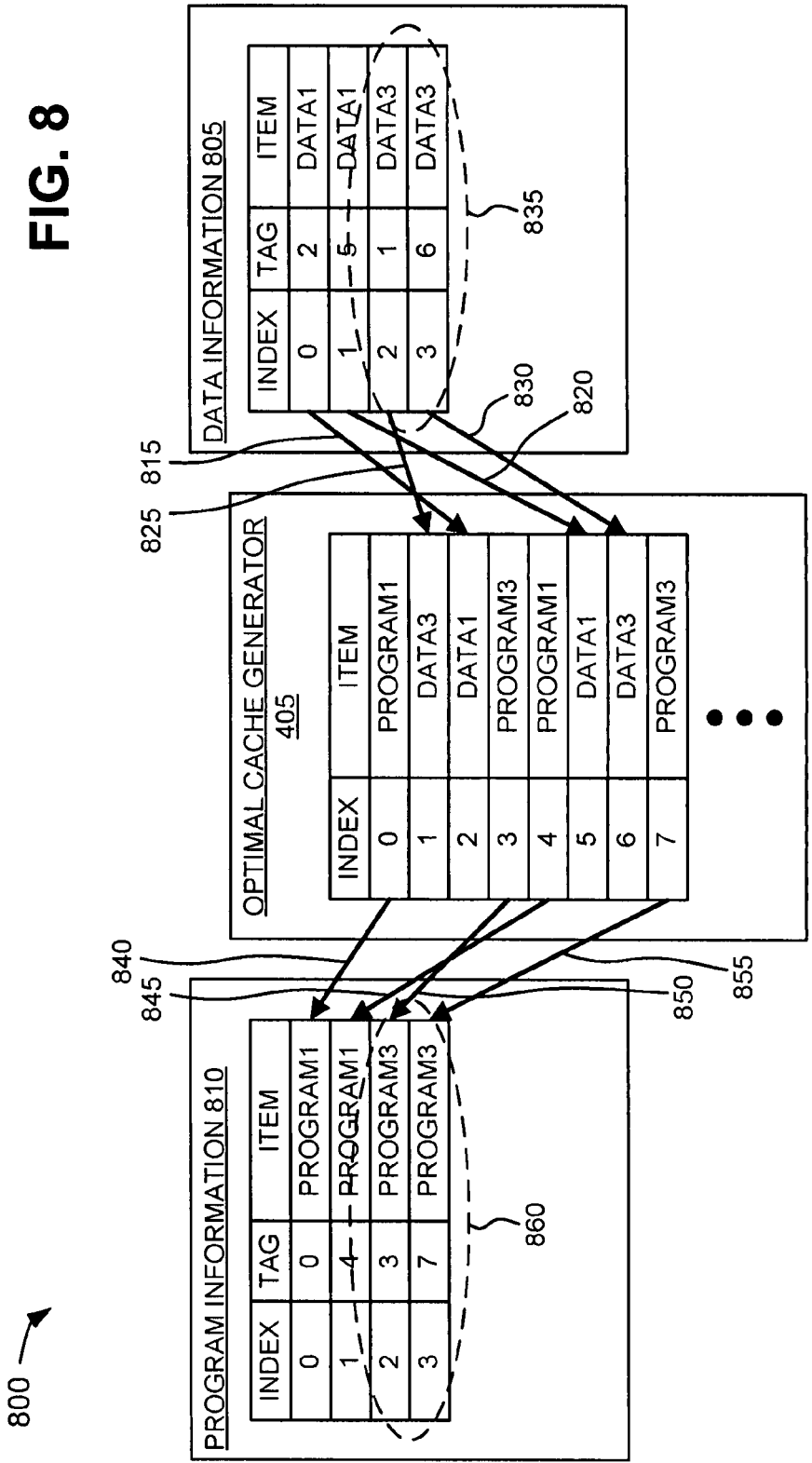

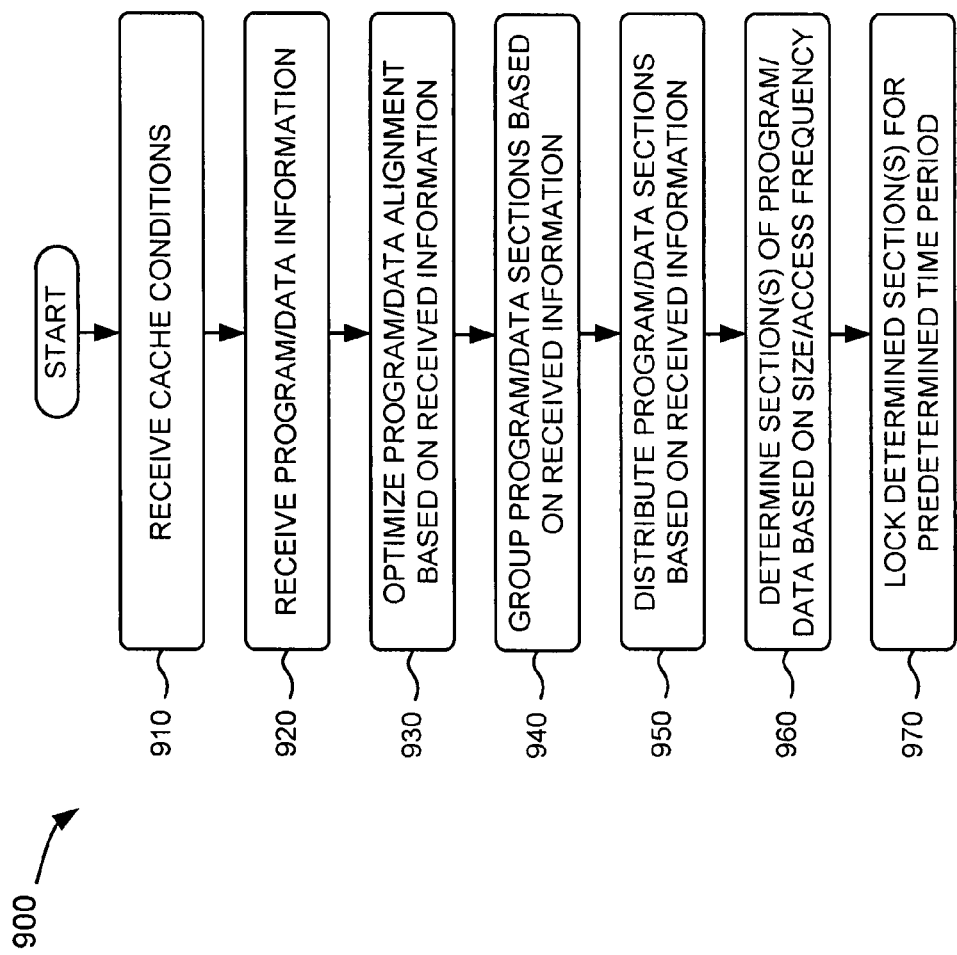

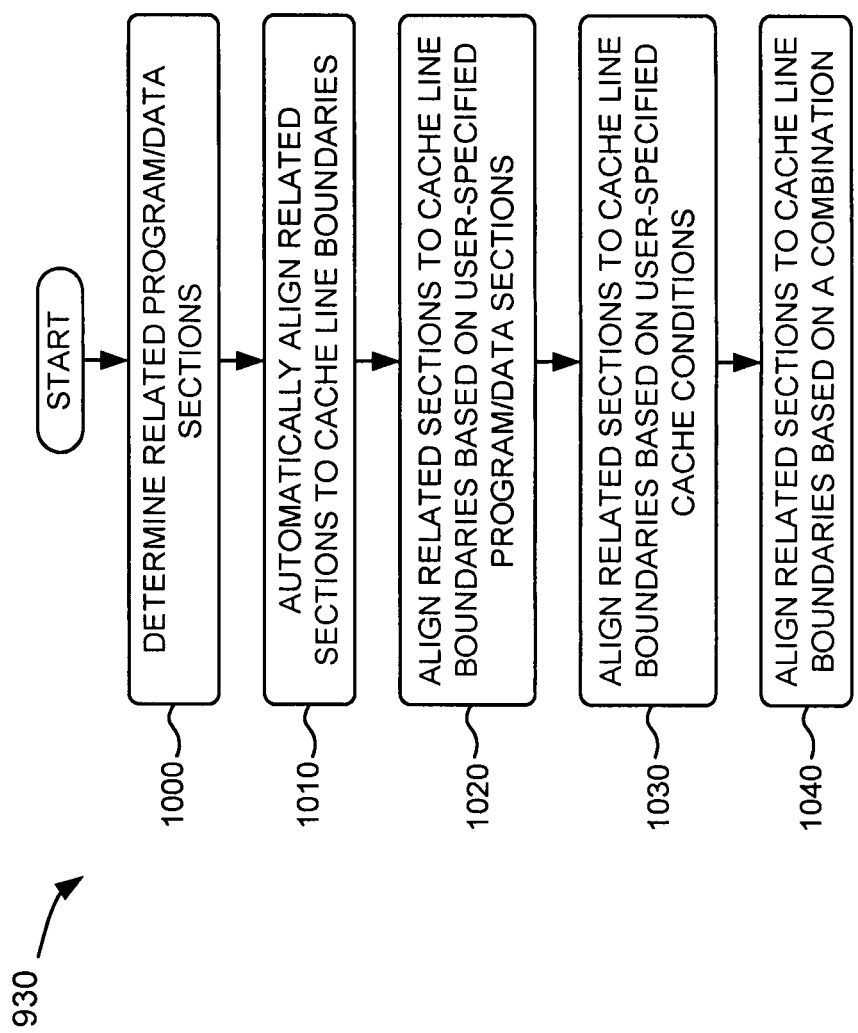

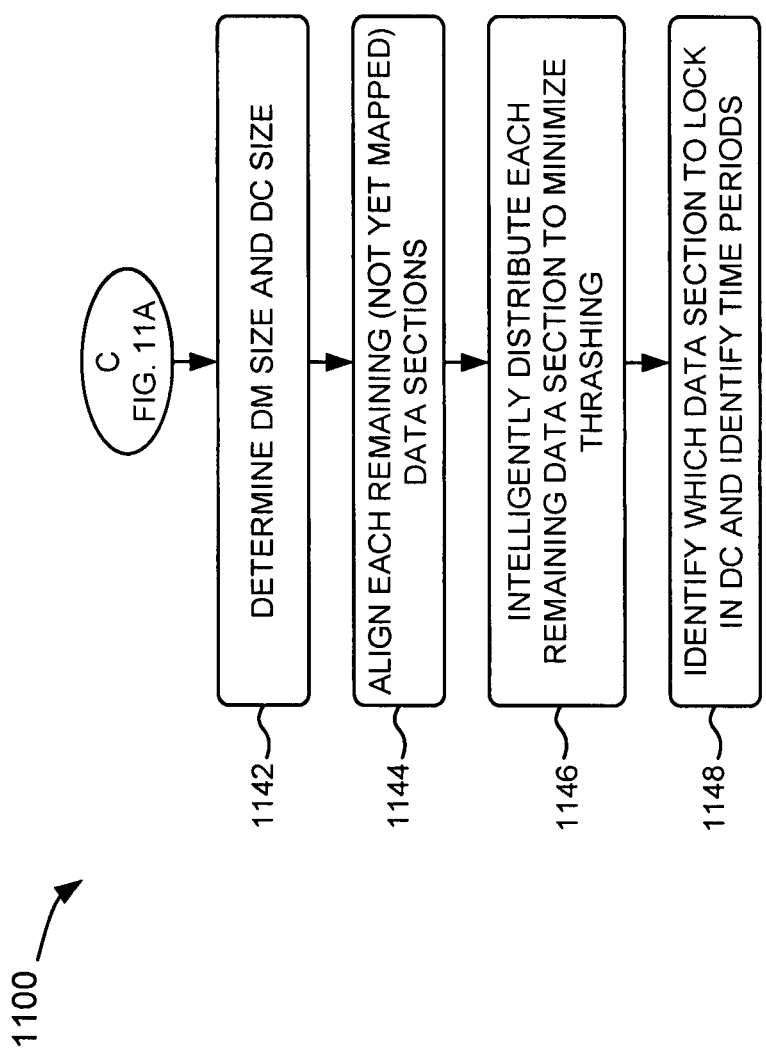

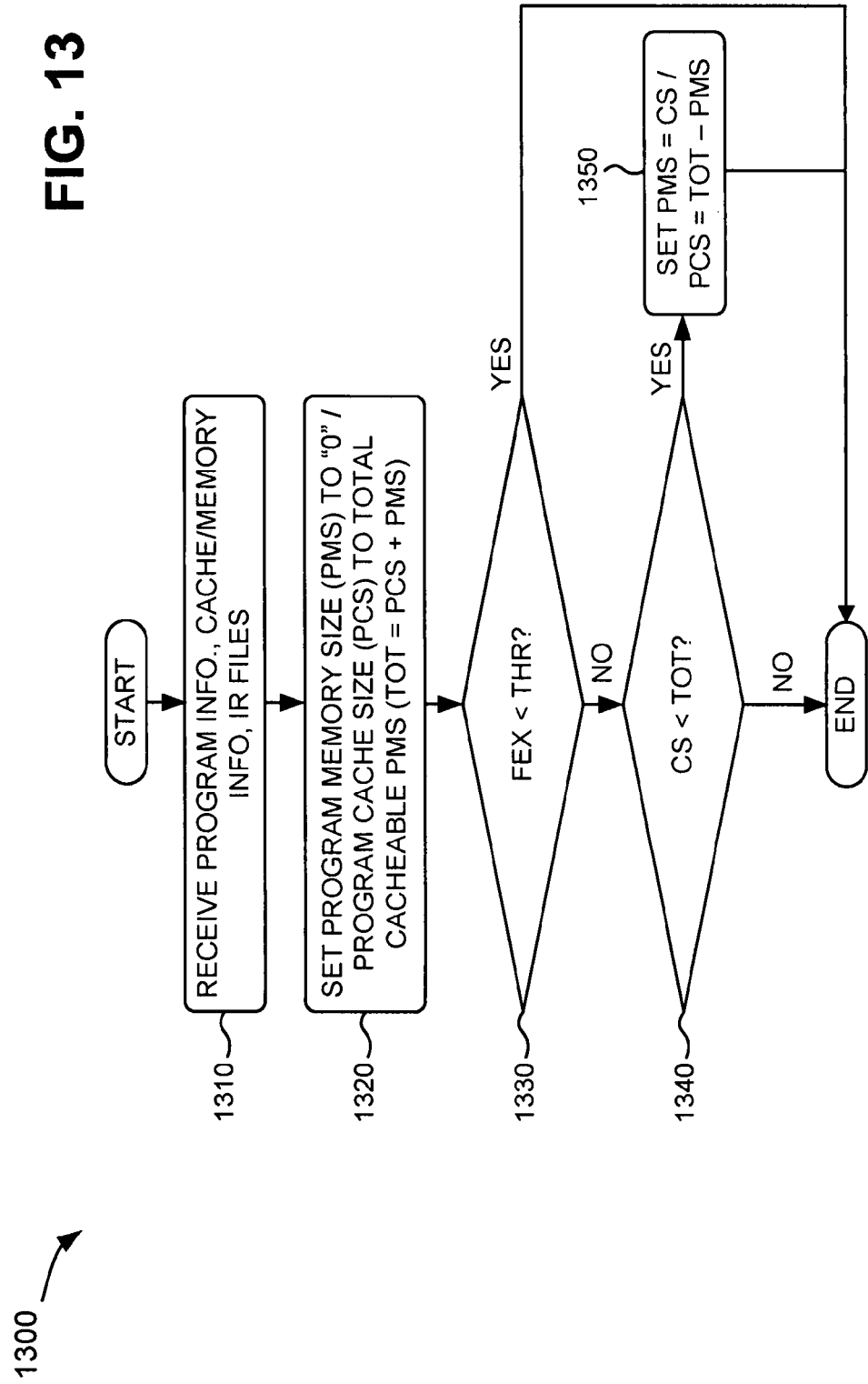

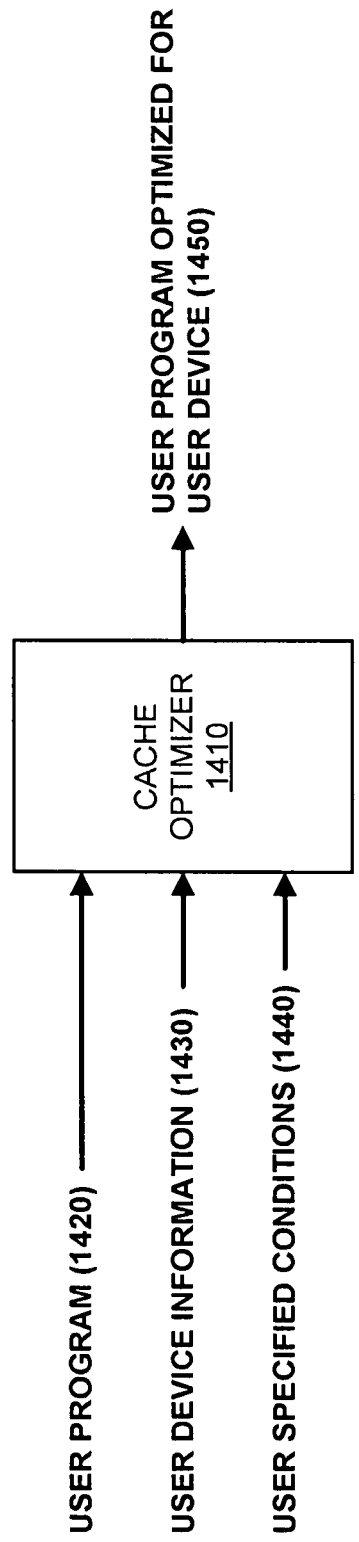

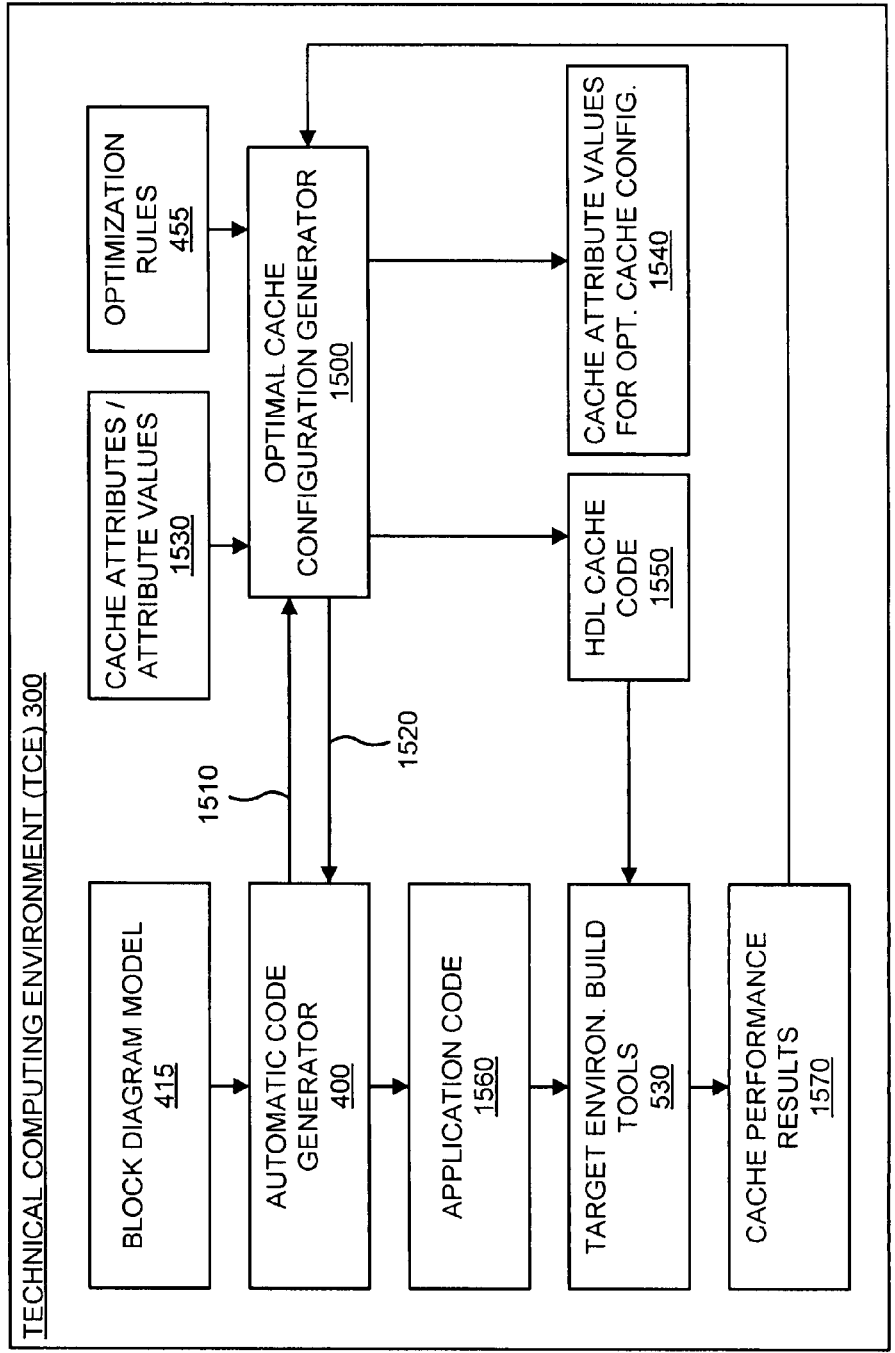

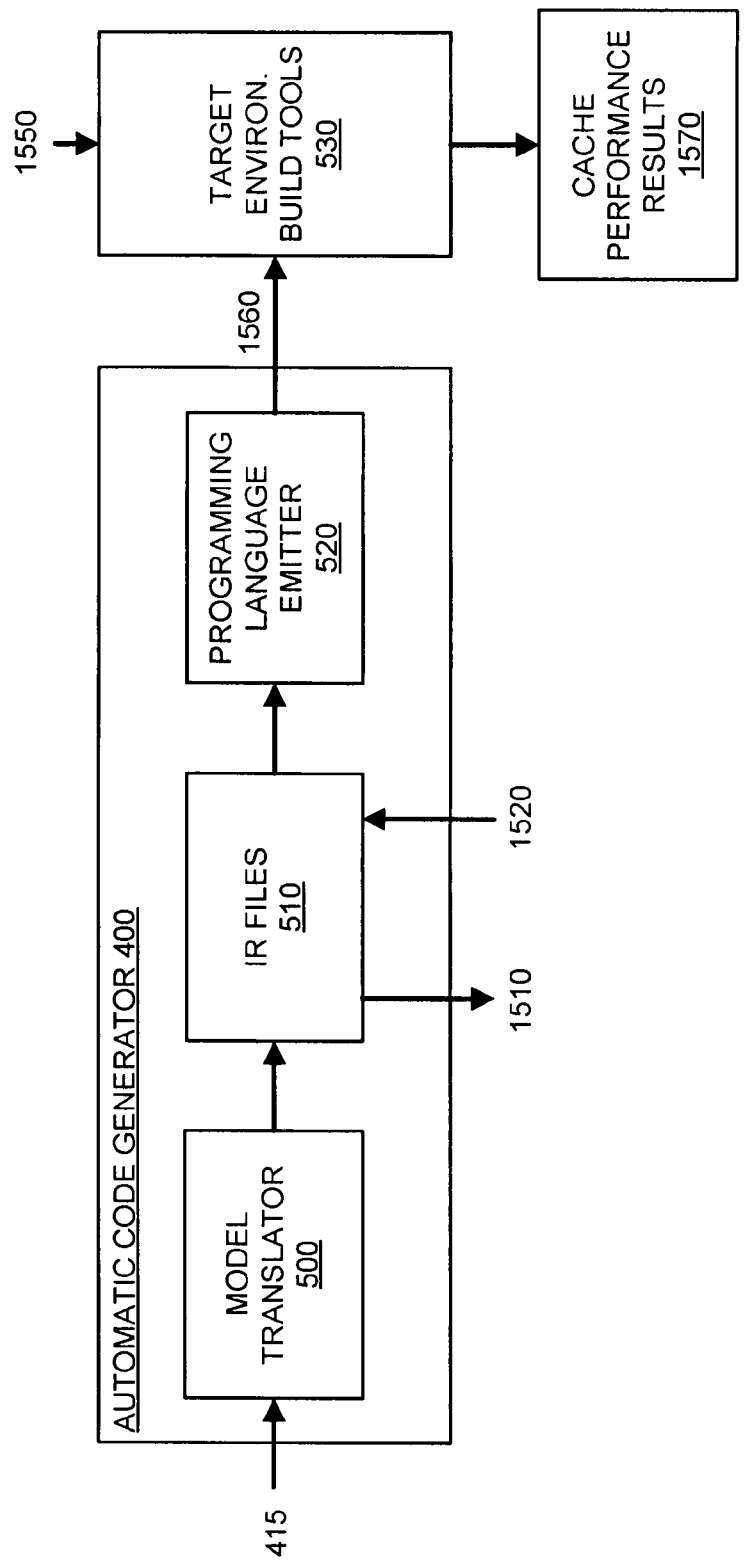

AUTOMATIC GENERATION OF CACHE-OPTIMIZED CODE

BACKGROUND

A cache memory or cache may be used by a central processing unit (CPU) of a computing device to reduce the average time to access a main memory, which is typically slower and larger than internal memory used for cache. The cache may be mapped to (or use) a smaller, faster memory (e.g., on a microprocessor close to the CPU) which stores copies of program (e.g., instructions) and/or data of a software application from the most frequently used main memory locations (e.g., external memories). If the program code and/or data are stored in the cache, future use of the program code and/or data can be made by accessing the cached copy rather than by re-fetching or re-computing the original program code and/or data from the slower main memory. A cache is made up of a pool of entries. Each entry may include a datum (i.e., a cache line or cache block), which in different designs may range in size from "8" to "512" bytes or more. Each entry of the cache may include an index (i.e., a unique number used to refer to that entry), and a tag that contains an index of the datum in the main memory which has been cached.

If a cache client (e.g., a CPU, a web browser, an operating system, etc.) wishes to access a datum in a main memory, the cache client may first check the cache. If a cache entry can be found with a tag matching a tag of the desired datum, the datum in the cache entry may be used instead of the datum in the main memory. This situation may be referred to as a "cache hit." If the cache is searched and does not contain the tag matching the tag of the desired datum, the situation may be referred to as a "cache miss." Cache misses may slow the datum retrieval process because they involve transferring the desired datum from the main memory, which is much slower than the cache, and may typically involve writing the desired datum to the cache from the main memory (e.g., for future access) before it is delivered to the CPU.

Multiple caches may be implemented with a computing device (e.g., a microprocessor that includes a CPU). To distinguish between multiple caches, a level notation may be used in which the higher the level, the farther away the cache is from the CPU. For example, a level 1 (L1) cache may be part of the microprocessor (i.e., provided "on-chip"), and a level 2 (L2) cache may also be part of the microprocessor but may be further away from the microprocessor than the L1 cache. In some implementations, the size of the cache may increase as the level increases, but the speed of the higher level cache may be less than the speed of the lower level cache. In other words, the capacity of the higher level cache may be greater than the capacity of the lower level cache, but it may take longer to move datum in and out of the higher level cache (e.g., by the CPU) than the lower level cache. In other implementations, there may be three or more levels of caches, with multiple caches at each level (e.g., one cache for program and/or one cache for storing data), and/or caches at a certain level may be shared by multiple CPUs. A cache-enabled microprocessor may permit the internal memory to be used as cache, as main memory, and/or partitioned between cache and main memory (e.g., a uniquely addressable memory).

Caches may have a certain replacement policy that decides which cache line may be removed (i.e., evicted) from the cache in case an incoming entry from the main memory is to be placed in the cache. If the replacement policy is free to choose any entry in the cache to hold the incoming entry, the cache is called a "fully associative cache." While a fully associative cache is very flexible, it is also very expensive to implement. At the other extreme, if each entry in the main memory can go in only one place in the cache, the cache is called a "direct mapped cache" (or "one-way set associative cache"). However, a direct mapped cache may cause what is known as "cache thrashing." Cache thrashing may occur if two or more entries, that may be frequently needed, are both mapped to the same cache line. Each time one of the entries is written to the cache, it overwrites another needed entry mapped to the same cache line. This causes cache misses and impairs program code and/or data reuse.

Many caches implement a compromise referred to as an "n-way set associative cache." In an n-way set associative cache, the cache may be broken into sets of cache lines. The CPU may select a particular set just as in direct mapping, and may use a fully associative mapping algorithm (e.g., a least recently used (LRU) algorithm) to select one of the "n" cache lines within the set for an incoming entry. Associativity is a tradeoff. Checking more places may take more power, area, and potentially time. On the other hand, caches with more associativity may suffer few cache misses.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 7 is an exemplary control flow graph of an intermediate representation that may be generated by the automatic code generator depicted in FIG. 5A;

FIG. 8 is an exemplary diagram of interactions between an optimal cache generator of the technical computing environment depicted in FIGS. 3 and 4, data information, and program information;

FIGS. 9-13 depict flow charts of exemplary processes according to implementations described herein;

FIG. 14 is an exemplary diagram of a system according to implementations described herein;

FIG. 15 is a diagram depicting exemplary operations of the technical computing environment illustrated in FIG. 3;

FIG. 16 is a diagram depicting exemplary operations of the automatic code generator illustrated in FIG. 4;

DETAILED DESCRIPTION

The following detailed description refers to the accompanying drawings. The same reference numbers in different drawings may identify the same or similar elements. Also, the following detailed description does not limit the invention.

Overview

Program code and/or data of a software application may be provided in a main memory in any order, which may be misaligned for optimal cache use. A software application may improve execution performance through effective memory alignment of the program code and/or data in the main memory. For example, effective memory access times may be improved by properly aligning program code and/or data on cache line boundaries because it may allow for efficient program code and/or data reuse in loops. If the program code and/or data cross the cache line boundaries, then there may be a net performance penalty for the memory access because the program code and/or data may occupy more cache space than necessary, which may prevent other frequently-accessed program code and/or data from residing in the cache.

Figure 1:
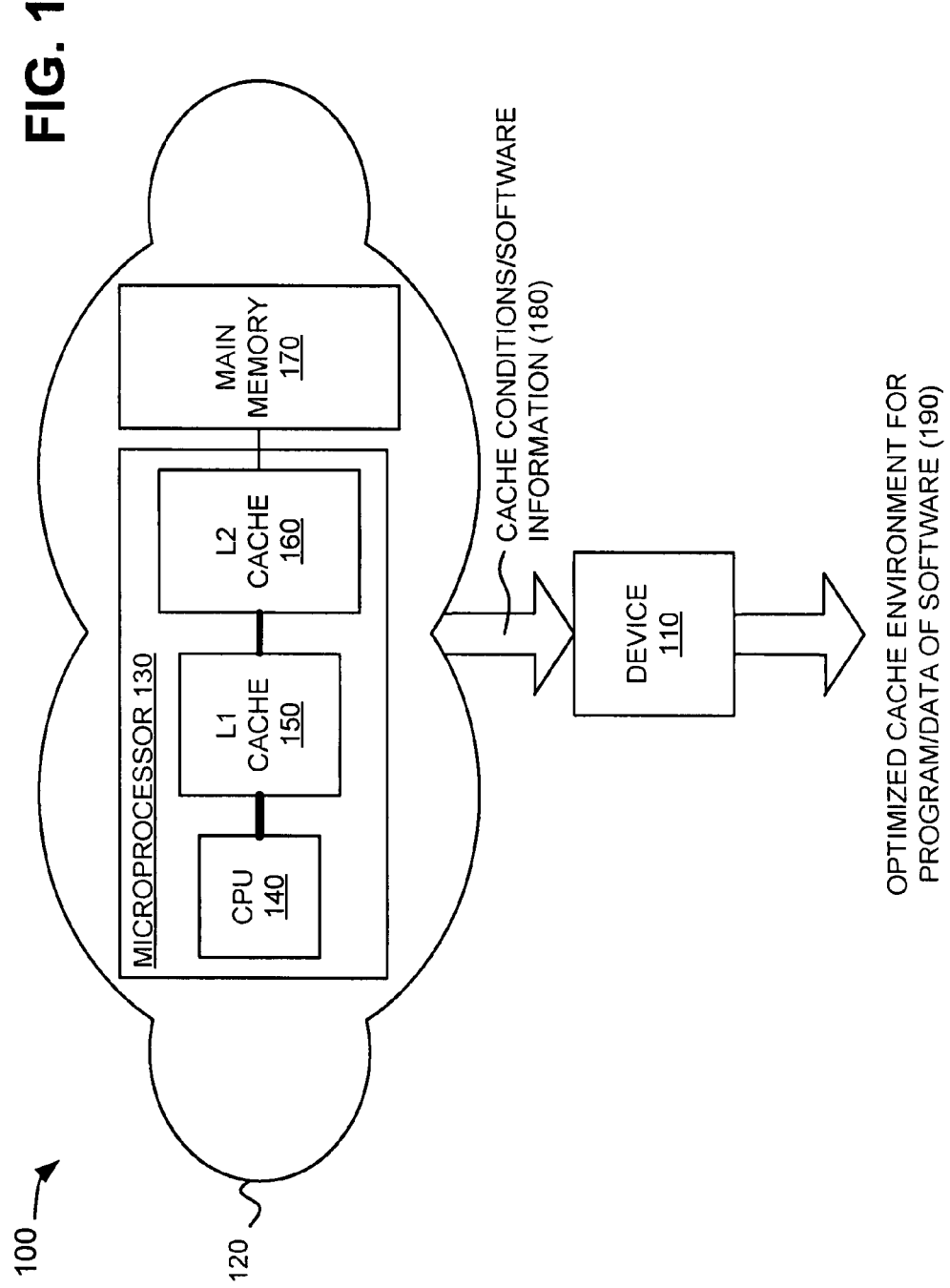
FIG. 1 is an exemplary diagram illustrating a concept described herein.

Implementations described herein may automatically optimize cache storage for program code and/or data of a software application in terms of cache hits to improve execution performance of the software application. FIG. 1 is an exemplary diagram illustrating a concept described herein. As illustrated in FIG. 1, a system 100 may include a device 110 and a cache design 120. Device 110 may include an entity. An entity may be defined as a device, such as a personal computer, a server, a laptop, or another type of computation or communication device, a thread or process running on one of these devices, and/or an object executable by one of these devices.

In an exemplary implementation, device 110 may provide a web service that permits access to one or more components. A "web service," as the term is used herein, is to be broadly interpreted to include any software application that allows machine-to-machine communications over a network (e.g., a local area network (LAN), a metropolitan area network (MAN), a wide area network (WAN), such as the Internet, etc.). For example, a web service may communicate with a client (e.g., another device) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

In one example, a web service may allow a destination (e.g., a computer operated by a customer) to create an optimal cache management scheme using hardware and/or software that may be operated by a service provider. For example, the customer may be permitted access to device 110 to create an optimal cache management scheme if the customer subscribes to one of the offered web services. The service provider may maintain a database that includes parameters, such as parameters that enable creation of the optimal cache management scheme. The service provider may perform a lookup operation in the database if a request for optimal cache generation is received from the customer. The service provider may connect the customer to optimal cache generation resources that are available based on parameters in the database.

In another example, the customer may receive the web service on a subscription basis. A subscription may include substantially any type of arrangement, such as monthly subscription, a per-use fee, a fee based on an amount of information exchanged between the service provider and the customer, a fee based on a number of processor cycles used by the customer, a fee based on a number of optimal cache generation resources used by the customer, etc.

Cache design 120 may include a variety of components. For example, as shown in FIG. 1, cache design 120 may include a microprocessor 130 (which may include a central processing unit (CPU) 140 and a level 1 (L1) cache 150), a level 2 (L2) cache 160, and/or a main memory 170. Microprocessor 130 may include a processor, microprocessor, or processing logic that may interpret and execute instructions, e.g., via CPU 140. CPU 140 may include an execution portion of microprocessor 130. L1 cache 150 and L2 cache 160 may include storage devices that may store information and instructions for execution by CPU 140. For example, in one implementation, L1 cache 150 and L2 cache 160 may include storage devices where frequently accessed program code and/or data (e.g., of a software application provided in main memory 170) may be temporarily stored for rapid access. Main memory 170 may include a random access memory (RAM) or another type of dynamic storage device that may store information and instructions for execution by CPU 140.

In one implementation, cache conditions (e.g., for a software application to be optimized) related to cache design 120 may be automatically provided to device 110. In other implementations, a user of device 110 may specify cache conditions for the software application to be optimized. The software application may include program (e.g., instructions) and data that may be stored in one or more of L1 cache 150, L2 cache 160, and main memory 170. Cache conditions and/or information related the software application to be optimized may be provided to device 110, as indicated by reference number 180.

A variety of cache conditions (or cache information) may be provided to device 110. For example, cache conditions may include a number of levels of cache available (e.g., two levels if L1 and L2 cache are available), a cache size for each available cache (e.g., divided between program cache and data cache), a cache line size for each available cache, cache alignment of each block of program and/or each signal (e.g., data) between two blocks, trip count frequency (e.g., number of execution times of a block of program), and/or other cache conditions to invoke cache alignment. A variety of software information may be provided to device 110. For example, software information may include related sections of program code and/or data, most frequently used sections of program code and/or data, user-specified preferred sections of program code and/or data, etc.

Device 110 may use cache conditions/software information 180 to align, group, and/or intelligently distribute (e.g., place in a partitioned memory bank of the cache) individual program code and/or data sections of the software application in order to achieve optimal effective cache memory access times (i.e., maximize cache hit likelihood). Thus, device 110 may provide an optimized cache environment for the program code and/or data of the software application (e.g., an optimal cache management scheme), as indicated by reference number 190. In one implementation, device 110 may optimize the cache environment by aligning the program code and/or data of the software application at the cache line boundaries of the cache (e.g., L1 cache 150 and/or L2 cache 160). In other implementations, device 110 may optimize the cache environment by determining preferred sections of program code and/or data (e.g., based on section size and/or frequency of access), and by locking the preferred sections in the cache (e.g., L1 cache 150 and/or L2 cache 160) for a period of time (e.g., a duration of frequent accesses). In still other implementations, device 110 may determine an optimal partitioning scheme for L1 cache 150, L2 cache 160, and/or main memory 170.

Although FIG. 1 shows exemplary components of system 100, in other implementations, system 100 may contain fewer, different, or additional components than depicted in FIG. 1. For example, cache design 120 may include a level 3 (L3) cache in addition to L1 cache 150 and L2 cache 160. In still other implementations, one or more components of system 100 may perform one or more tasks described as being performed by one or more other components of system 100. In further implementations, one or more caches may be shared by one or more CPUs in a microprocessor.

Exemplary Device Architecture

Figure 2:
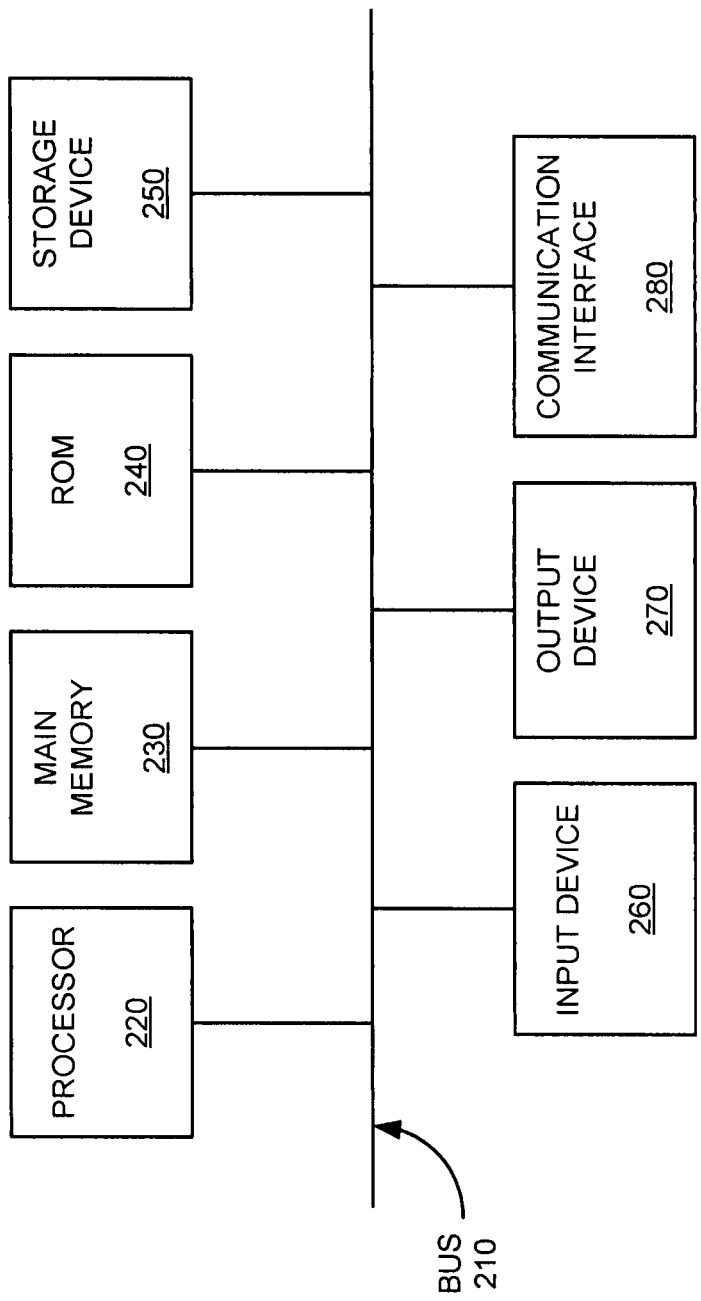
FIG. 2 is an exemplary diagram of a device of FIG. 1.

FIG. 2 is an exemplary diagram of device 110. As illustrated, device 110 may include a bus 210, a processor 220, a main memory 230, a read only memory (ROM) 240, a storage device 250, an input device 260, an output device 270, and/or a communication interface 280. Bus 210 may include a path that permits communication among the components of device 110.

Processor 220 may include a processor, microprocessor, or other types of processing logic that may interpret and execute instructions. For example, processor 220 may be implemented as a general purpose processing device (e.g., a central processing unit (CPU) or as another type of processing device, such as a reduced instruction set processor, a field programmable gate array (FPGA) an application specific integrated circuit (ASIC), etc.

In one implementation, processor 220 may include a single core processor or a multi-core processor. In another implementation, processor 220 may include a single processing device or a group of processing devices, such as a processor cluster or computing grid. In still another implementation, processor 220 may include multiple processors that may be local or remote with respect each other, and may use one or more threads while processing.

In a further implementation, processor 220 may include multiple processors implemented as units of execution capable of running copies of a technical computing environment. As used herein, the term "unit of execution" may refer to a device that performs parallel processing activities. For example, a unit of execution may perform parallel processing activities in response to a request received from a client. A unit of execution may perform substantially any type of parallel processing, such as task, data, or stream processing, using one or more devices. For example in one implementation, a unit of execution may include a single processing device that includes multiple cores and in another implementation, the unit of execution may include a number of processors. Devices used in a unit of execution may be arranged in substantially any configuration (or topology), such as a grid, ring, star, etc.

Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to device 110, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables device 110 to communicate with other devices and/or systems. For example, communication interface 280 may include mechanisms for communicating with another device 110.

As described herein, device 110, consistent with exemplary implementations, may perform certain processing-related operations. Device 110 may perform these operations in response to processor 220 executing software instructions contained in a computer-readable medium, such as main memory 230. A computer-readable medium may be defined as a physical or logical memory device and/or carrier wave.

The software instructions may be read into main memory 230 from another computer-readable medium, such as storage device 250, or from another device via communication interface 280. The software instructions contained in main memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 110, in other implementations, device 110 may contain fewer, different, or additional components than depicted in FIG. 2. In still other implementations, one or more components of device 110 may perform some or all of the tasks described as being performed by one or more other components of device 110.

Exemplary Technical Computing Environment

Figure 3:
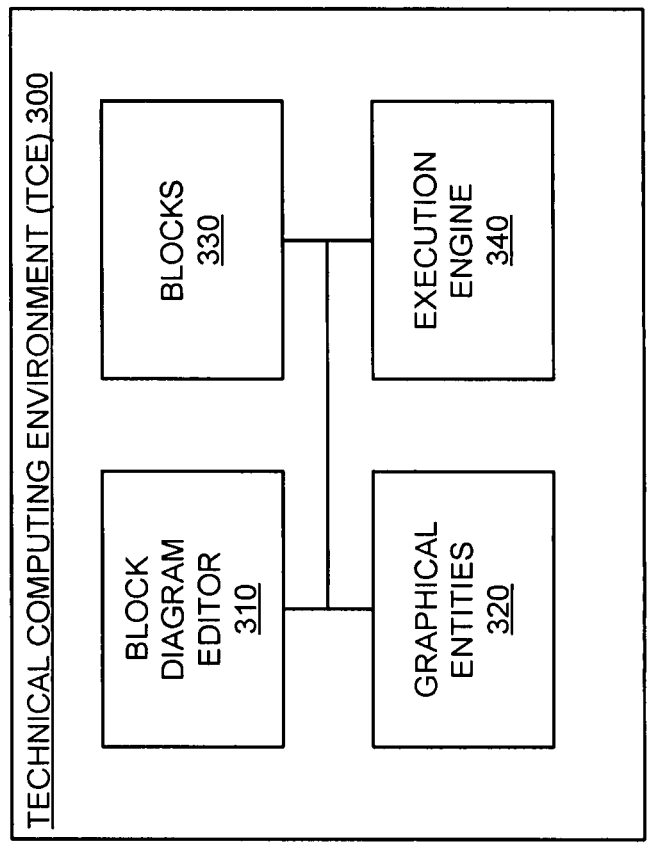
FIG. 3 is an exemplary diagram of a technical computing environment that may be used by the device of FIGS. 1 and 2.

FIG. 3 is an exemplary diagram of a technical computing environment (TCE) 300 that may be used by device 110 to automatically optimize cache storage for program code and/or data of a software application. In one implementation, TCE 300 may be provided within a computer-readable medium of device 110 (e.g., ROM 240 and/or storage device 250). In other implementations, TCE 300 may be provided in another device that is accessible by device 110 (e.g., via communication interface 280).

A "technical computing environment" or "TCE," as the terms are used herein, is to be broadly interpreted to include any hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a technical computing environment may include a dynamically-typed programming language (e.g., the MATLAB® M language) that can be used to express problems and/or solutions in mathematical notations. For example, a technical computing environment (TCE) may use an array as a basic element, where the array may not require dimensioning. In addition, a technical computing environment (TCE) may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A technical computing environment (TCE) may further provide mathematical functions and/or graphical tools (e.g., for creating plots, surfaces, images, volumetric representations, etc.). In one implementation, a technical computing environment (TCE) may provide these functions and/or tools using toolboxes (e.g., toolboxes for signal processing, image processing, data plotting, parallel processing, etc.). In another implementation, a technical computing environment (TCE) may provide these functions as block sets. In still another implementation, a technical computing environment (TCE) may provide these functions in another way, such as via a library, etc.

A technical computing environment (TCE) may be implemented as a text-based environment (e.g., MATLAB®; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink®, Stateflow®, SimEvents™, Real-Time Workshop®, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

As shown in FIG. 3, TCE 300 may include a variety of components, such as a block diagram editor 310, graphical entities 320, blocks 330, and/or an execution engine 340. Block diagram editor 310 may graphically specify models of dynamic systems. In one implementation, block diagram editor 310 may permit a user to perform actions, such as construct, edit, display, annotate, save, and/or print a graphical model (e.g., a block diagram that visually and/or pictorially represents a dynamic system). In another implementation, block diagram editor 310 may permit a user to create and/or store data relating to graphical entities 320.

A textual interface with a set of commands may be provided to permit interaction with block diagram editor 310. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 320 may include entities (e.g., signal lines, buses, etc.) that represent how data may be communicated between functional and/or non-functional units and blocks 330 of a model. Blocks 330 may include fundamental mathematical elements of a block diagram model.

Execution engine 340 may process a graphical model to produce simulation results, may convert the graphical model into executable code, and/or may perform other analyses and/or related tasks. In one implementation, for a block diagram graphical model, execution engine 340 may translate the block diagram into executable entities (e.g., units of execution) following the layout of the block diagram. The executable entities may be compiled and/or executed on a device (e.g., device 110) to implement the functionality specified by the model.

Although FIG. 3 shows exemplary components of TCE 300, in other implementations, TCE 300 may contain fewer, different, or additional components than depicted in FIG. 3. In still other implementations, one or more components of TCE 300 may perform some or all of the tasks described as being performed by one or more other components of TCE 300.

Figure 4:
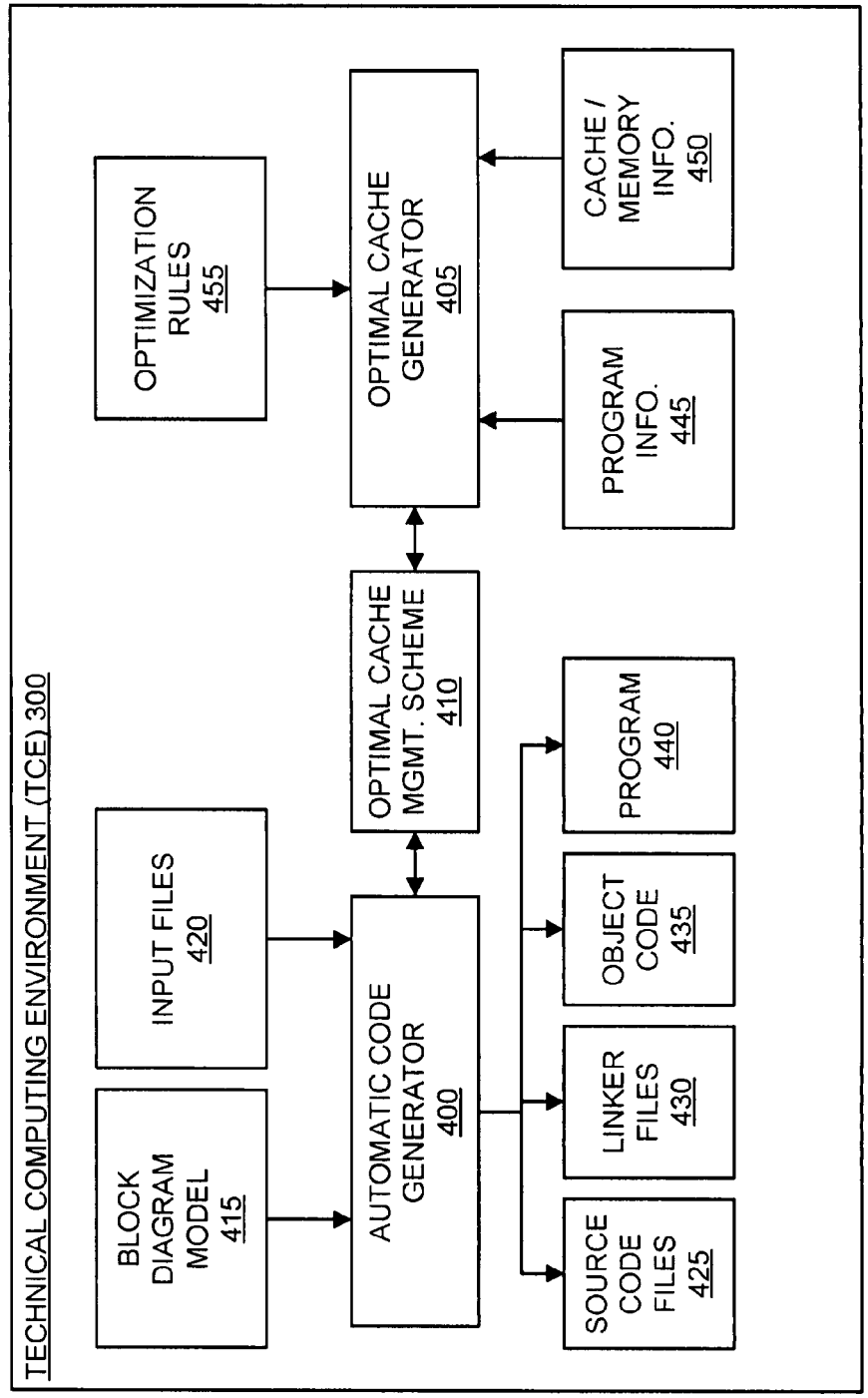
FIG. 4 is another exemplary diagram of the technical computing environment depicted in FIG. 3.

FIG. 4 is another exemplary diagram of TCE 300. As illustrated, TCE 300 may include an automatic code generator 400, an optimal cache generator 405, an optimal cache management scheme 410, a block diagram model 415, input files 420, source code files 425, linker files 430, object code 435, a program 440, program (or software) information 445, cache/memory information 450, and/or optimization rules 455.

Automatic code generator 400 may receive block diagram model 415, input files 420, and/or optimal cache management scheme 410, and may generate source code files 425, linker files 430, object code 435, and/or program 440 based on the received information. In an exemplary embodiment, automatic code generator 400 may include the Real-Time Workshop® available from The MathWorks, Inc. Further details of automatic code generator are provided below and in connection with FIG. 5A.

Optimal cache generator 405 may receive program information 445, cache/memory information 450, and/or optimization rules 455, and may generate optimal cache management scheme 410 based on the received information. Optimal cache generator 405 may use one or more optimization rules 455 to compare program information 445 to cache/memory information 450 and to generate optimal cache management scheme 410 according to configured logic of the one or more optimization rules 455. Further details of optimal cache generator 405 are provided below in connection with FIG. 5B.

In one implementation, optimal cache generator 405 may generate one or more optimal cache management schemes 410 for program 440 to execute on a processor (e.g., CPU 140 of microprocessor 130) of a computational hardware device that may include one or more cacheable memory elements (e.g., L1 cache 150, L2 cache 160, etc.) in the processor and/or external to the processor.

In another implementation, optimal cache generator 405 may use program information 445 and/or cache/memory information 450 to align, group, and/or intelligently distribute individual program code and/or data sections of program 440 in order to achieve optimal effective cache memory access times (i.e., maximize cache hit likelihood) and/or minimize cache thrashing. Optimal cache generator 405 may output optimal cache management scheme 410 for program code and/or data sections of program 440. In one example, optimal cache generator 405 may optimize cache memory access times provided by device 110 by aligning the program code and/or data sections of program 440 at the cache line boundaries of the cache. In another example, optimal cache generator 405 may optimize cache memory access times provided by another device (e.g., external to device 110) by aligning the program code and/or data sections of program 440 at the cache line boundaries of the cache of the other device.

In still another implementation, optimal cache generator 405 may use program information 445 and/or cache/memory information 450 to determine preferred sections of program code and/or data (e.g., based on section size and/or frequency of access) of program 440. Optimal cache generator 405 may provide and lock the preferred sections in a cache (e.g., L1 cache 150 and/or L2 cache 160) for a period of time (e.g., a duration of frequent accesses). For example, if preferred sections of program 440 are utilized for the first twenty seconds from the startup of program 440, optimal cache generator 405 may lock these preferred sections in a cache for at least the first twenty seconds after startup of program 440.

Optimal cache management scheme 410 may include an optimized cache environment for the program code and/or data sections of program 440. In one implementation, optimal cache management scheme 410 may include optimized cache environment 190 described above in connection with FIG. 1. In another implementation, optimal cache management scheme 410 may provide a description of the placement of code and data segments of program 440 into sections of memory of a computational hardware device (e.g., a device providing cache design 120). As shown in FIG. 4, optimal cache management scheme 410 may be provided to automatic code generator 400.

Block diagram model 415 may represent a design and/or an algorithm to be implemented on a device (e.g., a device providing cache design 120) that includes a single and/or multiple processors, and/or one or more cacheable memory elements internal and/or external to the processors. In one implementation, block diagram model 415 may include multiple block diagram models, with each model representing one or more components of a hardware device (e.g., a processor of a device providing cache design 120). In another implementation, block diagram model 415 may include a partitioned block diagram model, with each partition representing a component of a multi-component hardware device. Block diagram model 415 may include one or more files capable of being accessed by TCE 300 and/or automatic code generator 400. In one example, block diagram model 415 may be provided by a block diagram modeling environment (e.g., TCE 300) and/or another similar modeling environment. In another example, automatic code generator 400 may receive block diagram model 415 from an application program interface (API) call to another application or via an interface to another system.

Input files 420 may include templates, commands, input parameters, configuration data, source code, data and class definitions, and/or any other information that may be used by automatic code generator 400 for block diagram model 415. Input files 420 may include files to provide input to and configure automatic code generator 400 to generate source code files 425 for a target hardware platform (e.g., optimal cache management scheme 410). For example, if automatic code generator 400 includes the Real-Time Workshop®, input files 420 may include target language compiler script files (e.g., ".tlc" files). The ".tlc" files may provide sections of programming instructions to be implemented for block references (e.g., as found in block diagram model 415) during the code generation process, may provide data and/or class definitions for data element references in block diagram model 415, and/or may include compiler directives, built-in functions, and/or other code generation commands to direct automatic code generator 400 during the code generation process.

Source code files 425 may include program instructions of a programming language (e.g., a C programming language), may be provided in a predetermined format and/or style (e.g., following the American National Standards Institute/International Organization for Standardization (ANSI/ISO) C standard), and/or may include fixed-point and/or floating-point source code. The program instructions of source code files 425 may be generated to run on any operating system (e.g., a real-time operating system), and/or for a predetermined processor. The program instructions of source code files 425 may be optimized for performance, versatility, and/or a target hardware platform (e.g., optimal cache management scheme 410). Automatic code generator 400 may be configured via input files 420 to generate custom source code files 425 that may include a style and format based on input files 420. Automatic code generator 400 may be configured via input files 420 to provide custom source code files 425 that may support customizations, such as error handling, optimization, code and data reduction, code reusability, scoping of variables, and/or other characteristics of source code files 425 that may be modified during generation of source code files 425.

During generation of source code files 425, automatic code generator 400 may generate source code files 425 for each block of block diagram model 415, and may place source code files 425 and data segments of the block's source code into a uniquely named memory section. In an exemplary implementation, automatic code generator 400 may associate source code files 425 and data segments of the block's source code to a named memory section by using a compiler director and/or a linker preprocessing directive of a programming language. For example, a "#pragma" statement in the C programming language may be used to specify compiler directives, to define control over the memory section where data may be placed, and to align data to a cache line boundary. In other examples, a "#pragma <section-name>" statement in the C programming language may create a defined section within an object file created by compilation, and a "#pragma <data-align-boundary>" statement may align data and/or a program on the cache line boundary.

Linker files 430 may be produced by automatic code generator 400 based on optimal cache management scheme 410, and may implement optimal cache management scheme 410. For example, automatic code generator 400 may automatically request optimal cache management scheme 410 from optimal cache generator 405 while automatically generating source code files 425 and/or building program 440. Automatic code generator 400 may build object code 435, including any named memory sections, into program 440 using linker files 430, which may represent optimal cache management scheme 410.

Object code 435 may include a compiled form of source code files 425, and may contain a sequence of instructions that a processor may understand. Automatic code generator 400 may build source code files 425 into object code 435 and/or an executable program (e.g., program 440). For example, automatic code generator 400 may compile source code files 425 and any linker files 430, drivers, and/or other programs via a compiling utility to create object code 435 and/or program 440.

Program 440 may include a compiled and executable form of source code files 425, and may contain a sequence of instructions that a processor may understand. Automatic code generator 400 may build source code files 425 into program 440, as described above. In one implementation, automatic code generator 400 may build multiple programs 440 from one or more block diagram models 415 in one or more executions. Automatic code generator 400 may produce multiple sets of source code files 435, multiple linker files 430, and/or multiple sets of object code 435 to produce multiple programs 440. In one example, each program 440 and associated source code files 435, linker files 430, and/or object code 435 may represent algorithms of block diagram model 415 to be implemented on separate processors of a computational hardware device which may include communication interfaces between the processors (e.g., a communication interface to a shared memory used by the processors). Each communication interface of programs 440 may transfer data between processors, may broadcast data to multiple processors, and/or may synchronize processing across processors.

Program information 445 may include a description of attributes of program code and/or data segments of program 440. Each code and data segment in program information 445 may represent a block of block diagram model 415, and may be uniquely identified by a name. Program information 445 may include a size and/or other related unit of measurement of each of the code and data segments of program 440, a frequency of access by program 440 of the data segments, a frequency of execution by program 440 of the code segments, and a computational burden of each section of code of program 440. Program information 445 may assign a priority and/or some other weighted factor to each of the code and data segments in program information 445.

Program information 445 may be automatically generated by automatic code generator 400 and/or may be extracted from any of source code files 425, linker files 430, object code 435 produced by automatic code generator 400, or files or information produced by, e.g., target environment build tools 530 described below, during a compile and link process. Optimal cache generator 405 may obtain program information 445 from other files configured by a user, and/or from a system (e.g., a system separate from device 110) in accordance with a file specification understood by optimal cache generator 405. In one implementation, program information 445 may include related sections of program code and/or data of program 440, most frequently used sections of code and/or data of program 440, user-specified preferred sections of code and/or data of program 440, a code size of each code section retrieved from a memory map file (e.g., produced by target environment build tools 530, described below), etc. In other implementations, program information 445 may include any information associated with program 440 that may aid generation of optimal cache management scheme 410 by optimal cache generator 405.

Cache/memory information 450 may include a description of attributes and physical layout of physical cache elements of a computational hardware device (e.g., a device implementing cache design 120), such as cacheable memory of one or more processors and/or any external memory elements accessed by one or more processors. In one implementation, cache/memory information 450 may include information describing a type of memory used for cache, an access type and a rate of each type of memory, a size of each type of memory, and/or any other configuration of the memory that may impact performance of program 440 storing code and data segments on the one or more memory elements. In another implementation, cache/memory information 450 may include a number of levels of cache available (e.g., two levels if L1 and L2 cache are available), a cache size for each available cache (e.g., divided between program cache and data cache), a cache line size for each available cache, cache alignment of each block of program and/or each signal (e.g., data) between two blocks, user-defined or optimization rule-defined trip count frequency (e.g., number of execution times of a block of program), a size of cacheable memory for each cache, a size of cacheable memory for program cache and/or data cache for each cache, associative information, and/or other cache conditions to invoke cache alignment.

Cache/memory information 450 may include one or more files generated by a configuration environment of optimal cache generator 405 and/or may be configured in optimal cache generator 405. Optimal cache generator 405 may obtain cache/memory information 450 from an interface and/or an API call to another application storing or having access to cache related information of the computational hardware device targeted for implementation by block diagram model 415. For example, optimal cache generator 405 may interface with a block diagram modeling environment (e.g., TCE 300) that produced block diagram model 415 to obtain such information. In another example, optimal cache generator 405 may interface with any device-related software (e.g., an electronic design software tool) to obtain information about the cache layout of a target computational hardware device. In one implementation, cache/memory information 450 may be included with block diagram model 415 and may be automatically generated by automatic code generator 405. In another implementation, cache/memory information 450 may be obtained through a user interface from the user, from a user-defined file, etc.

In one example, cache/memory information 450 may include an optimal split between addressable RAM (e.g., of device 110) and cache if device 110 includes RAM/cache partitioning. In another example, cache/memory information 450 may include a cache replacement policy (e.g., a fully associative cache, a direct mapped cache, or an n-way set associative cache) that is to be used. In still another example, cache/memory information 450 may include any information that may aid in the generation of optimal cache management scheme 410 by optimal cache generator 405.

Optimal cache generator 405 may be configured with one or more optimization algorithms provided by a set of optimization rules 455. Optimization rules 455 may include a component, a module, a library, other software components, user-specified rules and algorithms, user-specified optimization parameters (e.g., execution frequency threshold), and/or any combination of the aforementioned that may be configured with optimization algorithms that optimal cache generator 405 may apply to generate optimal cache management scheme 410. Optimal cache generator 405 may apply the optimization algorithms to compare program information 445 of program 440 with cache/memory information 450 of the computational hardware device to generate optimal cache management scheme 410 for executing program 440 on the computational hardware device. The optimization algorithms may be applied to the comparison of program information 445 to cache/memory information 450 to achieve the fastest possible execution of program 440 (or a portion of program 440) on the targeted computational hardware device, and/or to determine optimal cache management scheme 410 in the shortest possible time or with the least amount of resources. As described above, automatic code generator 405 may use optimal cache management scheme 410 to build the code into executable program 440. As such, program 440 may be configured based on optimal cache management scheme 410 and may be configured to execute according to a desired performance created by optimization rules 455.

In one implementation, optimization rules 455 may provide a heuristic approach to generating optimal cache management scheme 410. For example, the heuristic approach may include obtaining program information 445 and cache/memory information 450 to perform the optimization. The approach may further include using attributes of the code and data segments of program 440 defined in program information 445 and/or attributes of cache in cache/memory information 450 to generate optimal cache management scheme 410. The approach may determine prioritization rules to apply to program information 445 and/or cache/memory information 450 (e.g., considering a size and access frequency of each code and data segment of program 440 in determining optimal cache management scheme 410).

Although FIG. 4 shows exemplary components of TCE 300, in other implementations, TCE 300 may include fewer, different, or additional components than depicted in FIG. 4. In still other implementations, one or more components of TCE 300 may perform some or all of the tasks described as being performed by one or more other components of TCE 300.

Exemplary Automatic Code Generator

Figure 5A:
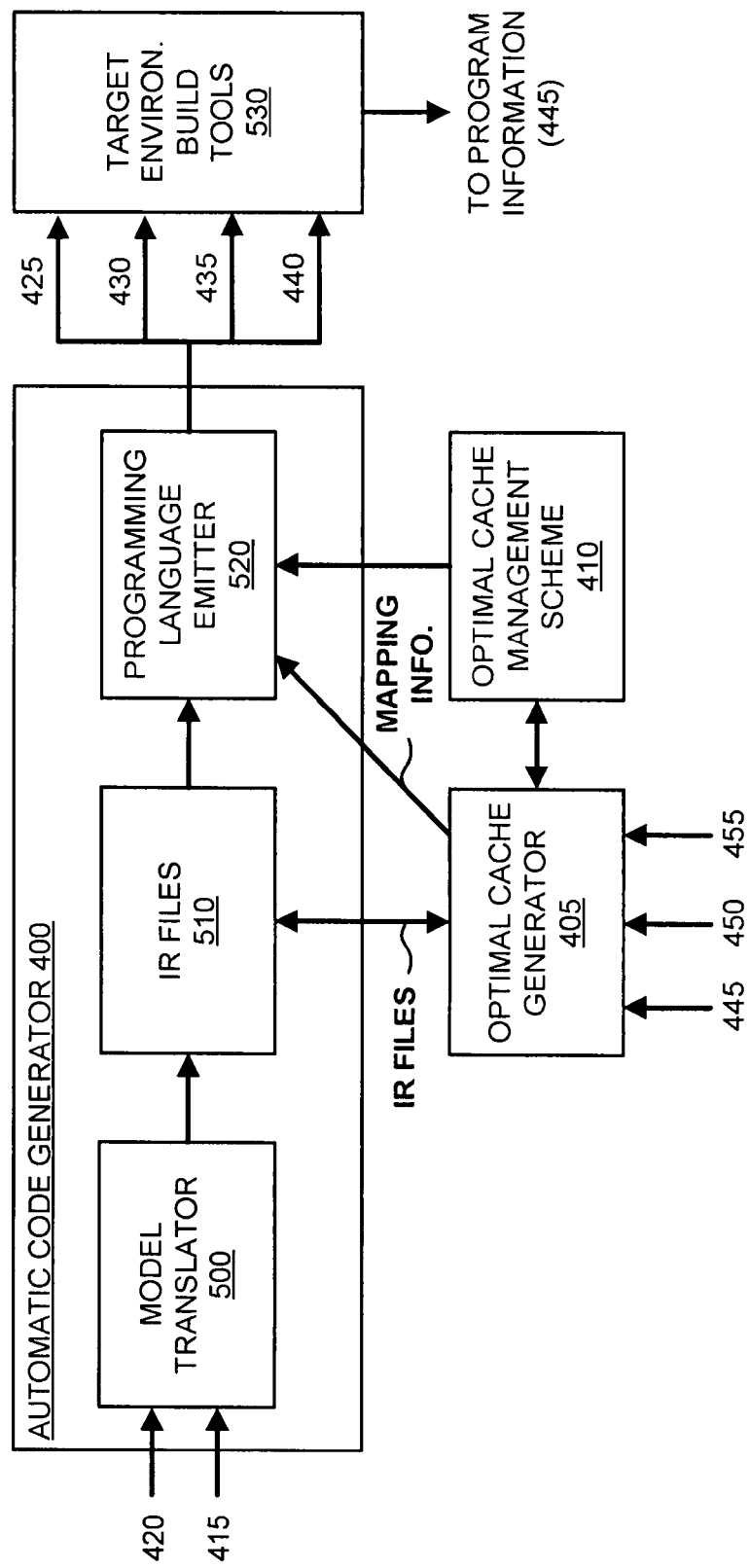
FIG. 5A is an exemplary diagram of an automatic code generator of the technical computing environment depicted in FIGS. 3 and 4.

FIG. 5A is an exemplary diagram of automatic code generator 400. As illustrated, automatic code generator 400 may include a variety of components, such as a model translator 500, intermediate representation (IR) files 510, and/or a programming language emitter 520.

Model translator 500 may receive block diagram model 415 and/or input files 420, and may generate IR files 510 based on block diagram model 415 and/or input files 420. For example, model translator 500 may translate block diagram model 415 and/or input files 420 into IR files 510.

IR files 510 may receive IR files from model translator 500 and/or from optimal cache generator, and may convey model specifics used to generate code. IR files 510 may provide model specifics used to generate code to optimal cache generator 405 and/or programming language emitter 520. Optimal cache generator 405 may use this information, along with program information 445, cache/memory information 450, and/or optimization rules 455, to generate optimal cache management scheme 410. Optimal cache management scheme 410 and/or mapping information (e.g., from optimal cache generator 405) may be provided to programming language emitter 520. In one implementation, IR files 510 may include predicted CPU times per execution of each code section, frequency of execution of each code section, frequency of access of each data section, a timeline of execution and data access for each code section and data section, respectively, and/or optimization parameters. Further details of IR files 510 are provided below in connection with FIGS. 6 and 7.

Programming language emitter 520 may receive model specifics from IR files 510, optimal cache management scheme 410, and/or mapping information, and may use this information to generate cache-optimized code (e.g., source code files 425, linker files 430, object code 435, and/or program 440).

In an exemplary operation, automatic code generator 400 (e.g., model translator 500) may receive block diagram model 415 and/or input files 420 and may generate source code by translating block diagram model 415 into one or more source code files 425. For example, automatic code generator 400 may include the Real-Time Workshop® and may receive block diagram model 415 generated with Simulink®. Simulink® may create and/or store block diagram model 415 into a model file that includes a ".mdl" file extension. As part of the code generation process, the Real-Time Workshop® may receive a ".mdl" model file, and may analyze the model file to generate IR files 510. IR files 510 may include a hierarchical structure of records describing systems and their blocks and connections based on the ".mdl" model file.

A language compiler (e.g., a target language compiler) may be included with the Real-Time Workshop®, and may work with ".tlc" files and/or ".rtw" files to produce code. The target language compiler may interpret a program that reads the description of the ".rtw" file. If the target language compiler encounters a record in the ".rtw" file, it may use directives in the ".tlc" files corresponding to the record to direct the code generation process for the specific record. For example, the target language compiler may use block ".tlc" files, which may specify the particular code for a block, to transform each block into code. If the target language compiler reads a record in the ".rtw" file that references a block, the target language compiler may apply code from the corresponding block ".tlc" file to generate code for the block in source code files 425. Model wide ".tlc" files may be used to provide input to the target language compiler for global customization of the code. Model wide ".tlc" files may direct the target language compiler to generate main routines that may provide entry points into the program, source code header files that may setup data structures, and/or utility functions that may support code for particular blocks. The block and model wide ".tlc" files may be modified to generate customized code for blocks and to generate any desired global customizations to the code. As further shown in FIG. 5A, source code files 425, linker files 430, object code 435, and/or program 440 may be provided to target environment build tools 530. Target environment build tools 530 may include build tools that use source code files 425, linker files 430, object code 435, and/or program 440 to compile and link generated code into a target environment executable code and/or memory map files. Target environment build tools 530 may provide the target environment executable code and/or memory map files to program information 445. The memory map files may contain program size information that can be used to better optimize the cache management scheme.

Although FIG. 5A shows exemplary components of automatic code generator 400, in other implementations, automatic code generator 400 may include fewer, different, or additional components than depicted in FIG. 5A. In still other implementations, one or more components of automatic code generator 400 may perform some or all of the tasks described as being performed by one or more other components of automatic code generator 400.

Exemplary Optimal Cache Generator

Figure 5B:
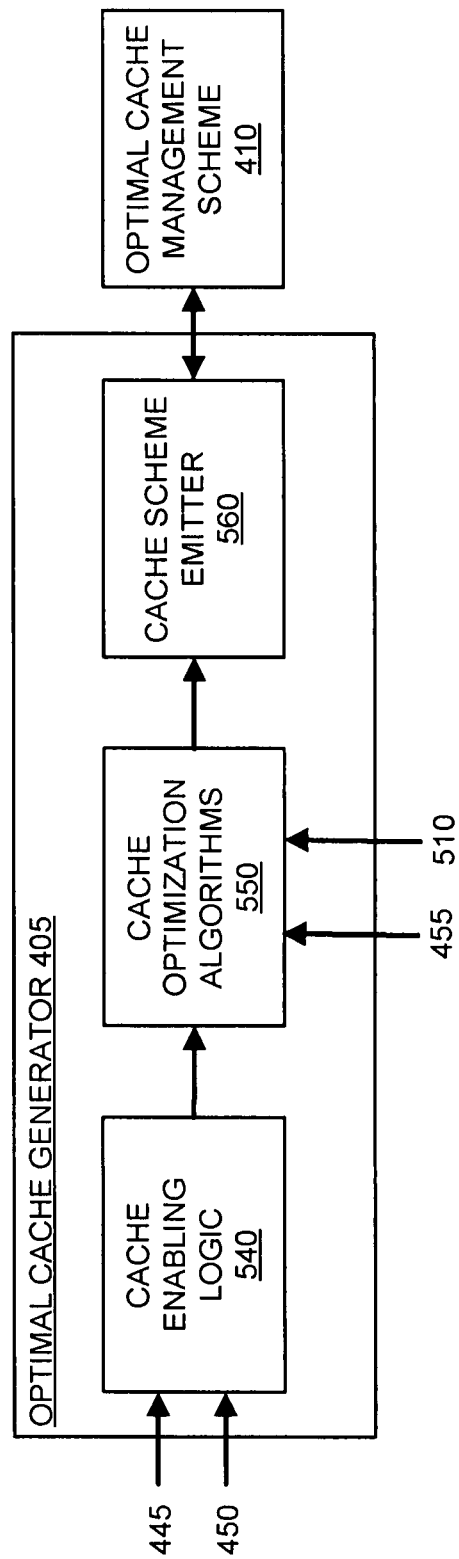
FIG. 5B is an exemplary diagram of an optimal cache generator of the technical computing environment depicted in FIGS. 3 and 4.

FIG. 5B is an exemplary diagram of optimal cache generator 405. As illustrated, optimal cache generator 405 may include cache enabling logic 540, cache optimization algorithms 550, and/or cache scheme emitter 560.

Cache enabling logic 540 may receive program information 445 and/or cache/memory information 450, and may determine whether to enable cache. If cache is to be enabled, cache enabling logic 540 may determine how much of cacheable memory should be used for cache (for optimal cache performance) and how much should be used as a uniquely addressable memory, and/or may determine how much of cache may be allocated for program and/or data. Cache enabling logic 540 may provide its determinations to cache optimization algorithms 550.

Cache optimization algorithms 550 may receive the determinations from cache enabling logic 540, optimization rules 455, and/or IR files 510, and may determine optimal memory (e.g., a specified mapping to main memory 170) mapping for cache. Cache optimization algorithms 550 may provide its determination to cache scheme emitter 560.

Cache scheme emitter 560 may receive the optimal memory mapping for cache from cache optimization algorithms 550, and may output optimal cache management scheme 410. Optimal cache management scheme 410 may translate the information received from cache scheme emitter 560 into IR files and/or instructions for programming language emitter 520 to reflect in the generated code.

Although FIG. 5B shows exemplary components of optimal cache generator 405, in other implementations, optimal cache generator 405 may include fewer, different, or additional components than depicted in FIG. 5B. In still other implementations, one or more components of optimal cache generator 405 may perform some or all of the tasks described as being performed by one or more other components of optimal cache generator 405.

Exemplary Intermediate Representation Generation

An "intermediate representation (IR)," as the term is used herein, is to be broadly interpreted to include any translation of a block model (e.g., block diagram model 415), a representation (e.g., a data structure that may be stored in memory, a file, a database, and/or any other acceptable storage medium), etc. An IR may be constructed from input data contained within a source language (e.g., a language used by a graphical model) and from which part or all of output data contained in a target language (e.g., a generated code) may be constructed. An IR may include a control flow graph (CFG), a data flow graph (DFG), a hybrid, and/or any other representation that preserves properties of information in the source language. An IR may allow for serial and/or parallel processing of the representation in the source language within the IR. The use of an IR may permit translation of a representation in a source language into a representation in a target language such that a system implementation may be generated from an initial system model.

An IR may be generated from a textual and/or graphical model (e.g., a model created with TCE 300) before generating code represented by a programming language (e.g., C, C++, FORTRAN, Java, etc.), a hardware description language (e.g., Verilog, etc.), a scripting language (e.g., Perl, Python, Javascript, etc.), and/or a machine or assembly language. To do this, automatic code generator 400 may parse block diagram model 415 into syntactical components and may use the syntactical components to construct an IR such that the IR may represent the semantics of block diagram model 415.

Automatic code generator 400 may allow a user to develop an IR for user-specified elements. The IR may be based on computations to be performed, and may not follow model elements (e.g., as they are presented in a graphical model). The IR may permit optimizations (e.g., cache optimizations) to be applied across multiple elements of a graphical model.

Figure 6:
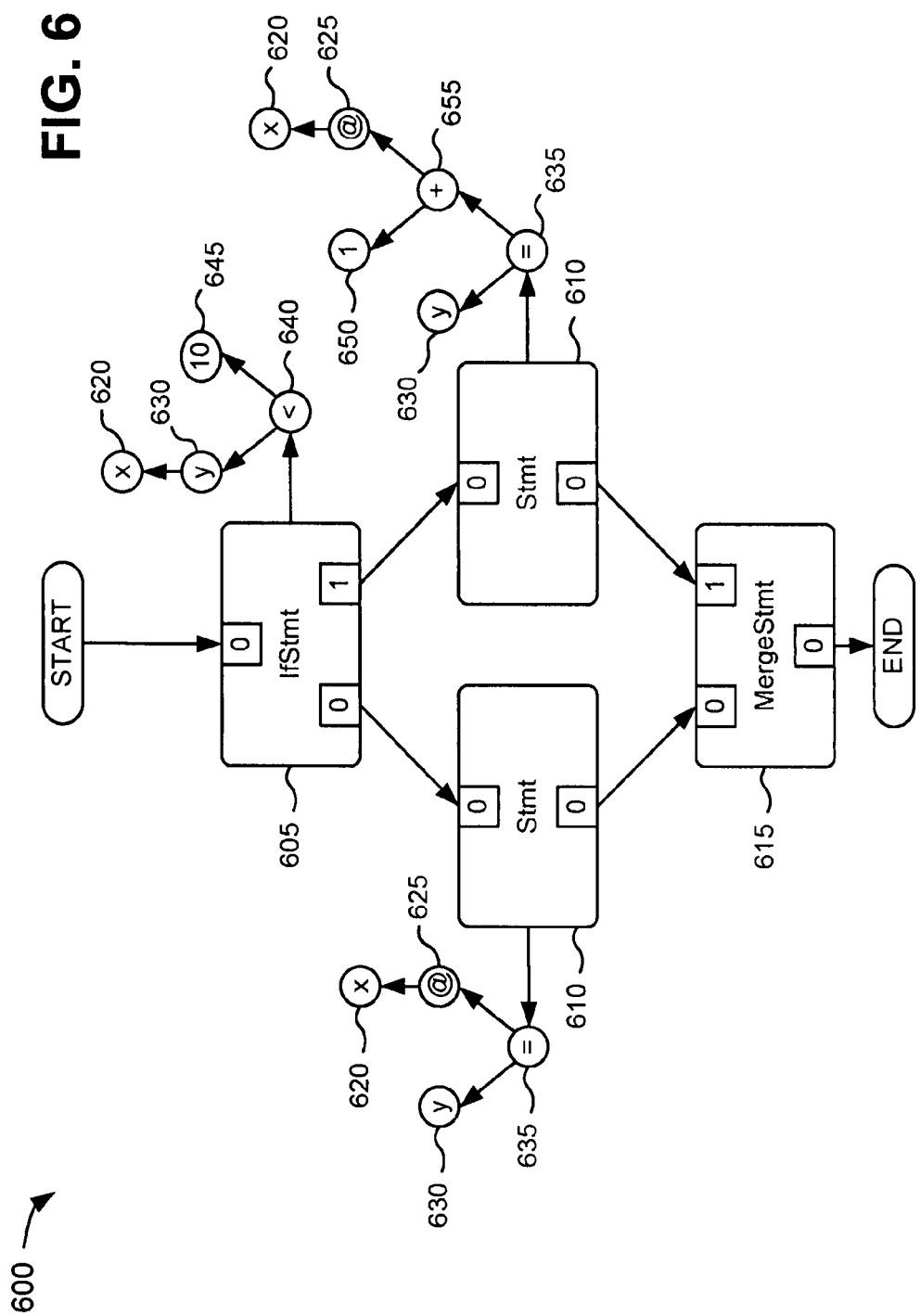
FIG. 6 is an exemplary diagram of an intermediate representation (IR) that may be generated by the automatic code generator depicted in FIG. 5A.

FIG. 6 is an exemplary diagram of an intermediate representation (IR) 600 that may be generated by automatic code generator 400. As illustrated, IR 600 may contain CFG parts (e.g., reference numbers 605-615) and DFG parts (e.g., reference numbers 620-655). In this exemplary IR 600, the DFG parts may represent operations performed by assign nodes and/or a compare node of the CFG parts. The C code that may be generated from IR 600 may include the following syntax:

```
int foo(int x)
{
  int y;
  if (x<10) {
    y=1+x;
  } else {
    y=x;
  }
  return y;
}
```

As shown in FIG. 6, IR 600 may begin at a Start node and may continue to an IfStmt node 605, which may evaluate an if-statement. This evaluation may provide a result of an inequality comparison between a value of a variable "x" (620) and a value of "10" (645). To access the value of a variable, a dereference may be performed, as indicated by "@" nodes 625. If an inequality "x<10" (640) holds true, the right-hand branch may be followed, as indicated by a port marked "1." IR 600 may then continue to a Stmt node 610 (right side of FIG. 6). Otherwise, a left-hand branch may be followed, as indicated by a "0" port, and IR 600 may continue to a Stmt node 610 (left side of FIG. 6). In the left-hand branch, a variable "y" (630) may be assigned a value of "x" via an "=" node 635. To access the value of variable "x" (620), a dereference may be performed, as indicated by "@" node 625. In the right-hand branch, variable "y" (630) may be assigned a sum of the value of variable "x" (620) and a value "1" (650), via an "=" node 635. A sum operator 655 may be indicated as a node marked "+" with two arguments (i.e., value "1" (650) and dereference 625 of variable "x" (620)). The two conditional flow paths may be merged, via a MergeStmt node 615, and the flow path of IR 600 may end.

Automatic code generator 400 may perform the following exemplary operations on IR files 510. Automatic code generator 400 may parse block diagram model 415, and may generate one or more IRs (e.g., IR files 510) from the parsed block diagram model 415. In one example, the IR may be a control flow graph (CFG) that captures semantics of block diagram model 415. An IR represented by a CFG may include nodes that represent algorithmic aspects of block diagram model 415, and may include edges that indicate a flow of the algorithms. Subsequently, automatic code generator 400 may generate code (e.g., via program language emitter 520) from the one or more IRs.

FIG. 7 depicts an exemplary control flow graph 700 of an IR that may be generated by construction and general transformation phases of a code generation process. Control flow graph 700 may begin with a start node 705, and may proceed to a conditional node 715 via an edge 710. Conditional node 715 may provide an evaluation of a condition. If the condition is false, control flow graph 700 may proceed to a merge node 735 via an edge 730. If the condition is true, control flow graph 700 may proceed to an assign node 725 via an edge 720. Assign node 725 may assign a value to a variable and may be based on an algebraic equation. Assign node 725 may proceed to merge node 735 via an edge 740. Merge node 735 may perform a merge function and may proceed to an end node 750 via an edge 745.

In one implementation, an IR may be transformed into another IR to arrive at a lower-level representation that may be converted into a desired low level target language. A process of transforming an IR into a lower-level representation may be referred to as "lowering." There may be many stages of lowering processes in the transformation of an IR into a lower-level representation. The same and/or a similar lowering process may be employed more than once. Lowering processes may transform the IR into a state that may be suitable to a backend of a code generation process. If an IR has been transformed into a lower-level representation, a backend utility may be used (e.g., by automatic code generator 400) to generate code in a target language.

Automatic code generator 400 may include a transformer that may convert a first IR into a second IR. The first IR may represent algorithmic aspects (e.g., additions, multiplications, logic evaluations at decision points to determine branches of computation, function evaluations, etc.) of an element of a graphical model (e.g., block diagram model 415). The transformer may transform the first IR by replacing an integration operation with basic operations that may be directly computed. To this end, the transformer may attempt to match a pattern in the generated IR of an element and/or a portion of a graphical model. The transformer may identify a pattern in the generated IR that matches a pattern (e.g., a pattern depicted in a graphical representation), and may replace the identified pattern in the generated IR with another pattern (e.g., another pattern depicted in a graphical representation).

In one example, the transformer may analyze and transform the first IR into the second IR (which may be simulated). If the first IR is represented by a CFG, the transformer may identify nodes of the CFG that are not supported by a simulator and may replace the non-supported nodes with basic operations that may be supported by the simulator. The transformation may result in the second IR, which may be simulated.

Pattern matching may be implemented in various ways, but may be guided by heuristics to manage computational complexity. Modular and hierarchical graph rewriting methods may further improve the transformation efficiency. The transformer may employ any number of rewriting rules that may be extended by textual transformation information. The rewriting rules may include negativity constraints.

In one implementation, automatic code generator 400 may apply an optimization technique (e.g., optimal cache management scheme 410) to generate a second IR from a first IR. Applying optimization techniques to an IR may improve characteristics of the generated code (e.g., program 440) by, for example, reducing execution time and/or required space, and/or may improve efficiency and/or effectiveness of the generated code and/or the code generation process. For example, if a vector is used in a finite state machine model and a target language is the C programming language, then one of the lowering processes may include transforming calculations related to the vector into a for loop.

Optimization techniques may further increase conformance to industrial standards and/or target environment (e.g., TCE 300) requirements (e.g., optimization techniques may increase an ability to generate code that is compatible with such standards/requirements). Applying optimization techniques to IRs may reduce a size of code generated from the IRs. For example, the size of the generated code may determine resource (e.g. cache) usage if the generated code is compiled into a list (e.g., a netlist) for hardware layout. Applying optimization techniques to IRs may also reduce an overall size of variables used in the generated code.

In one implementation, the application of optimization techniques by automatic code generator 400 may be iterative. In another implementation, there may be multiple transitions of the IRs before the optimization techniques may be applied, and there may be multiple transitions of the IRs while applying the optimization techniques. At each transition, one or more optimization techniques may be applied by automatic code generator 400. In other implementations, an optimization technique may be applied multiple times during the code generation process.

In one implementation, automatic code generator 400 may debug IRs as follows. Automatic code generator 400 may implement associations between elements in a graphical model and nodes in an IR. For example, a user may set breakpoints on execution of elements in the graphical model, which may cause execution to halt at corresponding operation in the IR. Automatic code generator 400 may map data in the IR back to the graphical model to enable debugging of the graphical model. For example, an IR may include meta tags to identify derivation of content of the IR. A meta tag may associate the IR content with content that may be used to generate the IR. The content of an IR may be derived from, for example, elements in a graphical model, optimization rules, model configuration options, etc.

Automatic code generator 400 may provide an optimized IR that combines computations of elements. If a value from one element is to be displayed, automatic code generator 400 may substitute a more detailed and/or less optimized IR if requested during execution. For profiling purposes, automatic code generator 400 may maintain an amount of computational time that is spent in parts of the IR. This information may be presented to the user in terms of elements of the model.

In one implementation, automatic code generator 400 may generate an IR (e.g., IR files 510) for simulation. For example, automatic code generator 400 may generate the following pseudo code to support a computational simulation.

1. //
2. //Generate intermediate representation for
3. //discrete integration of Y=X+U*Ts
4. //
5. //Retrieve data
6. DataStore*U=get block input(block);
7. DataStore*Ts=get block sample time(block);
8. DataStore*X=get block state(block);
9. DataStore*Y=get block output(block);
10. DataStore*tmpData=create temp data store( );
11. //
12. //Construct simulation operation of tmpData=U*Ts
13. SimOpNode*op1=create_sim_op_multiply(tmpData, U, Ts);
14. //
15. //Construct simulation operation of Y=X+tmpData
16. SimOpNode*op2=create_sim_op_add(Y, X tmpData);
17. //
18. //Create an object of intermediate representation
19. IRGraph irGraph=create_intermediate_representation_graph( );
20. //
21. //Insert the simulation operations to the intermediate representation
22. irGraph→insert(op1);
23. irGraph→insert(op2);

The pseudo code may generate an IR for a discrete integration block. From line 6 to line 10 of the pseudo code may retrieve data stores for the discrete integration in the form of a data structure "DataStore." The data structure "DataStore" may include information about data (e.g., data type, dimension, complexity, memory storing the data, etc.). Line 13 of the pseudo code may generate a simulation operation node that multiplies an input "U" with a sample time "Ts" and may save results in a temporary data structure "DataStore tmpData." A data structure "SimOpNode" may include information about a simulation operation (e.g., operation type, input and output operation data, rounding and saturation mode, execution rate, simulation operation routines, etc.). Line 16 of the pseudo code may generate a second simulation operation node that adds a state "X" with "tmpData" and may save a result in a data structure "DataStore Y." In line 19 of the pseudo code, a data structure "IRGraph" may be created, may contain information about the IR (e.g., simulation operations, execution order, etc.), and may include a control flow graph. Lines 22 and 23 of the above pseudo code may add two simulation operations to the data structure "irGraph."

Exemplary Cache Optimization

FIG. 8 is an exemplary diagram 800 of interactions between optimal cache generator 405, data information 805, and program information 810. In one implementation, optimal cache generator 405, data information 805, and program information 810 may be provided in the same device 110. In other implementations, optimal cache generator 405 may be provided in a different device than a device that contains data information 805 and/or program information 810. In still other implementation, data information 805 and/or program information may be provided in a memory (e.g., main memory 170).

Optimal cache generator 405 may perform the tasks described above in connection with FIG. 4, and may arrange multiple entries related to a software application in a memory. For example, in one implementation, optimal cache generator 405 may arrange data information 805 and/or program information 810 in main memory 170. Each entry may include an index (or address), which may be a unique number used to refer to that entry, and a corresponding item, which may contain program (e.g., code) and/or data of the software application. For example, as shown in FIG. 8, the entry with an index of "0" may include a corresponding item of "PROGRAM1," the entry with an index of "1" may include a corresponding item of "DATA3," the entry with an index of "2" may include a corresponding item of "DATA1," etc. Items of program code and/or data may be related (e.g., "DATA1" at index "2" may be related to "DATA1" at index "5"), but may be provided in optimal cache generator 405 in any order (e.g., by a compiler). For example, as shown in FIG. 8, related items of program code and/or data may be misaligned (e.g., the "DATA1" items may not be adjacent to each other in optimal cache generator 405).

Data information 805 and program information 810 may correspond to data and/or program provided in a memory of a device (e.g., main memory 170). Data information 805 may include multiple entries related to the software application data. Each entry may include an index, a corresponding tag (which may refer to an index number of optimal cache generator 405), and a corresponding item (which may contain the software application data). For example, as shown in FIG. 8, the entry with an index of "0" may include a corresponding tag of "2" (which may provide a reference 815 to index "2" of optimal cache generator 405) and a corresponding item of "DATA1;" the entry with an index of "1" may include a corresponding tag of "5" (which may provide a reference 820 to index "5" of optimal cache generator 405) and a corresponding item of "DATA1;" the entry with an index of "2" may include a corresponding tag of "1" (which may provide a reference 825 to index "1" of optimal cache generator 405) and a corresponding item of "DATA3;" and the entry with an index of "3" may include a corresponding tag of "6" (which may provide a reference 830 to index "6" of optimal cache generator 405) and a corresponding item of "DATA3."

As further shown in FIG. 8, the entries of data information 805 may contain aligned, grouped, and/or intelligently distributed data sections of the software application (e.g., as provided by optimal cache generator 405). For example, the "DATA1" items may be aligned adjacent to each other (e.g., at cache line boundaries), and the "DATA3" items may be aligned adjacent to each other (e.g., at cache line boundaries). In another example, a preferred section 835 of data (e.g., based on section size and/or frequency of access) of the software application may be locked in cache for a period of time (e.g., by optimal cache generator 405).

Program information 810 may include multiple entries related to the software application program. Each entry may include an index, a corresponding tag (which may refer to an index number of optimal cache generator 405), and a corresponding item (which may contain the software application program). For example, as shown in FIG. 8, the entry with an index of "0" may include a corresponding tag of "0" (which may provide a reference 840 to index "0" of optimal cache generator 405) and a corresponding item of "PROGRAM1;" the entry with an index of "1" may include a corresponding tag of "4" (which may provide a reference 845 to index "4" of optimal cache generator 405) and a corresponding item of "PROGRAM1;" the entry with an index of "2" may include a corresponding tag of "3" (which may provide a reference 850 to index "3" of optimal cache generator 405) and a corresponding item of "PROGRAM3;" and the entry with an index of "3" may include a corresponding tag of "7" (which may provide a reference 855 to index "7" of optimal cache generator 405) and a corresponding item of "PROGRAM3."

As further shown in FIG. 8, the entries of program information 810 may contain aligned, grouped, and/or intelligently distributed program sections of the software application (e.g., as provided by optimal cache generator 405). For example, the "PROGRAM1" items may be aligned adjacent to each other (e.g., at cache line boundaries), and the "PROGRAM3" items may be aligned adjacent to each other (e.g., at cache line boundaries). In another example, a preferred section 860 of program (e.g., based on section size and/or frequency of access) of the software application may be locked in cache for a period of time (e.g., by optimal cache generator 405).

Although FIG. 8 shows exemplary entries of optimal cache generator 405, data information 805, and program information 810, in other implementations, optimal cache generator 405, data information 805, and program information 810 may contain fewer, different, or additional entries than depicted in FIG. 8.

EXAMPLES

The following exemplary implementations may relate to a specific processor (e.g., a Texas Instruments DM642 Digital Media processor), but may be equally applicable for any cache-based processor. The DM642 processor may include L1 and L2 caches, and the L1 cache may include a capacity of "16" kilobytes.

In a first example, a performance difference may be observed if cache is used with a data intensive application. For example, a simple dot product application may include two arrays, "a" and "b," that form a dot product output "c" as described by the following pseudo code:

```
c=0;
for (i=0; i<array_size; i++) {
    c=a[i]*b[i];
}
```

A dot product example may be executed one-hundred times (with cache turned off and with cache turned on) using the following code:

```
/******************************************************
* Dot Product Utility DotProduct_s32
*/
int32_T DotProduct_s32(const int32_T *pIn1, const int32_T *pIn2, int32_T nMiddleDim)
{
    int32_T output;
    int32_T iMiddleDim;
    int32_T curProduct;
    output = 0;
```

-continued

```
        for (iMiddleDim = 0; iMiddleDim < (nMiddleDim); iMiddleDim++) {
            curProduct = pIn1[iMiddleDim] * pIn2[iMiddleDim];
            output = output + curProduct;
        }
    /* end DotProduct_s32
    /******************************************************/.
```

For this example, data arrays "a" and "b" may be stored in external memory, and the L1 cache may be turned on and off for profiling. If the L1 cache is turned off, a time of "281" milliseconds may be required to perform one-hundred "1024-point" dot product operations. If the L1 cache is turned on, a time of "8" milliseconds may be required to perform one-hundred "1024-point" dot product operations. This may represent about a thirty-five times improvement in execution time.

In a second example, the effect of data alignment on cache efficiency may be determined. Since a cache controller retrieves data having a size of a cache line each time a cache miss occurs, improved efficiency may be achieved if data is aligned on a cache line boundary in memory and a size of data is a multiple of a cache line. For example, since the DM642 processor includes a "64-byte" cache line, data may be aligned on a "64-byte" boundary in memory. If data arrays "a" and "b" are not aligned on a "64-byte" boundary, performance of one-thousand "64-point" dot product operations may take "8.35" milliseconds. If data arrays "a" and "b" are aligned (e.g., by placing #pragma DATA_ALIGN(<a, b>, CACHE_L1D_LINESIZE) compiler directives in the generated code) on the L1 cache line boundary, performance of one-thousand "64-point" dot product operations may take "7.72" milliseconds. This may represent a 7.5% improvement in execution time. Depending on a nature of the algorithm, the improvement may be even more significant.

In a third example, the effect of cache capacity on data access efficiency may be determined. Since cache memory may be smaller than external memory, different data sets stored in the external memory may map to a same location in a cache. For example, the DM642 processor may include L1 cache (with a capacity of "16" kilobytes) that implements a two-way set associative replacement policy. Therefore, data elements that may be "8" kilobytes away from each other may map to the same cache line in the L1 cache. In this example, the following operation on three arrays (e.g., "a," "b," and "d") may be performed.

```
    for (i=0; i<array_size; i++) {
        c=a[i]*b[i]+d[i];
    }
```

A dot product example may be executed one-thousand times for the third example, using the following code:

```
    /* Model step function */
    void cache_example_step(void)
    {
        int i, j;
        { for (i = 0; i < 1000; i++)
            for (j = 0; j < PROD_SIZE; j++) {
                c = a[j] + b[j] + d[j];
            }
        }
    }.
```

Array "a" may be placed at location "0x80000000," array "b" may be placed at location "0x80002000," and array "d" may be placed at location "0x80004000." One-thousand "64-point" dot products may be performed, and an execution time may be profiled. The execution time may be "33.68" milliseconds since arrays "a," "b," and "d" may compete for the same location in the data cache. In order to prevent cache thrashing and to simultaneously contain the arrays in the cache, array "a" may be placed at location "0x80000000," array "b" may be placed at location "0x80000100," and array "d" may be placed at location "0x80000200." The execution time may dramatically improve to "3.89" milliseconds.

In a fourth example, a cache optimization algorithm based on static analysis of the generated code may be implemented considering the following case:

d=a.*b+c, where "a," "b," "c," and "d" may be vectors and the sign ".*" may denote an element-wise multiplication of two vectors (i.e., a.*b=[a(1)*b(1), a(2)*b(2), . . . , a(N)*b(N)] for vectors of N elements "a" and "b."). The mathematical operation given by the above equation may be translated into a "for" loop to be executed on an embedded processor as follows.

```
    double a[N];
    double x[N1];
    int y[N2];
    double b[N];
    int z1[N3];
    int z2[N3];
    double c[N];
    double d[N];
    for (i=0; I<N; i++) {
        d[i]=a[i]*b[i]+c[i];
    }
```

In this example, data sets or arrays "a," "b," "c," and "d" may be declared as global and may be mapped to a processor's address space by a compiler and a linker. Arrays "a," "b," "c," and "d" may exhibit a high degree of temporal and spatial locality. For maximum efficiency, arrays "a," "b," "c," and "d" may co-exist in cache if the processor is executing the "for" loop. However, with the default data declaration sequence provided above, arrays "a," "b," and "c" may be mapped to the same cache line. If this occurs, at every iteration of the "for" loop, the processor may attempt to access "a[i]," which may load a cache line to which "a[i]" may be mapped. The processor may attempt to load "b[i]," but since "b[i]" may be mapped to the same cache line, the processor may evict "a[i]." This process may be repeated "c[i]" is accessed. To prevent the possibility of such a scenario occurring, a data order layout in memory may be modified to reduce the chances of cache conflicts, and addresses of the data arrays may be aligned to coincide with cache lines to reduce the chance of unwanted data being loaded to cache.

For memory layout optimization, for example, an algorithm may be employed, and may create the following generated code:

```
    int y[N2];
    int z1[N3];
    int z2[N3];
    #pragma DATA_ALIGN(a, CACHE_L1_LINESIZE)
    double a[N];
    uint8 pad[N1];
    double b[N];
    uint8 pad[N2];
    double c[N];
    uint8 pad[N3];
    double d[N];
```

```
for (i=0; i<N; i++) {
    d[i]=a[i]*b[i]+c[i];
}.
```

Exemplary Processes

FIGS. 9-13 depict flowcharts of exemplary processes according to implementations described herein. The processes of FIGS. 9-13 may be performed by one or more software and/or hardware components within device 110. Alternatively, the processes may be performed by one or more software and/or hardware components within another device or a group of devices separate from or including device 110.

As shown in FIG. 9, a process 900 may begin with receipt of cache conditions (block 910), and receipt of program code and/or data of a software application (block 920). For example, in one implementation described above in connection with FIG. 4, optimal cache generator 405 of device 110 may receive cache/memory information 450 and/or program information 445 (e.g., information about program 440 and/or data of program 440).

As further shown in FIG. 9, an alignment of the program code and/or data may be optimized in memory based on the received information (block 930). For example, in one implementation described above in connection with FIG. 4, optimal cache generator 405 may use program information 445 and/or cache/memory information 450 to align individual program code and/or data sections of program 440 in order to achieve optimal effective cache memory access times (i.e., maximize cache hit likelihood). In one example, optimal cache generator 405 may optimize cache memory access times (e.g., generate optimal cache management scheme 410) by aligning the program code and/or data of program 440 at cache line boundaries.

The program code and/or data may be grouped in sections in memory based on the received information (block 940). For example, in one implementation described above in connection with FIG. 4, optimal cache generator 405 may use program information 445 and/or cache/memory information 450 to group individual program code and/or data sections of program 440 in order to achieve optimal effective cache memory access times (e.g., optimal cache management scheme 410).

As further shown in FIG. 9, the program code and/or data may be intelligently distributed in sections in memory based on the received information (block 950). For example, in one implementation described above in connection with FIG. 4, optimal cache generator 405 may use program information 445 and/or cache/memory information 450 to intelligently distribute individual program code and/or data sections of program 440 in main memory in order to achieve optimal effective cache memory access times.

Preferred section(s) of the program code and/or data may be determined based on section size and/or frequency of access (block 960), and may be locked in cache for a time period (block 970). For example, in one implementation described above in connection with FIG. 4, optimal cache generator 405 may use program information 445 and/or cache/memory information 450 to determine preferred sections of program code and/or data (e.g., based on section size and/or frequency of access) of program 440. Optimal cache generator 405 may provide and lock the preferred sections in cache for a period of time (e.g., a duration of frequent accesses).

FIG. 10 depicts the process blocks associated with process block 930. As shown, process block 930 may include determination of related section(s) of the program code and/or data (block 1000). For example, in one implementation, device 110 (e.g., optimal cache generator 405) may review the program code and/or data of the software application, and may determine which sections of the code are related. In one example, described above in connection with FIG. 8, optimal cache generator 405 may determine that the two "PROGRAM1" items are related, the two "PROGRAM3" items are related, the two "DATA1" items are related, and the two "DATA3" items are related. In another example, a user of optimal cache generator 405 may specify which sections of the code are related.

The related section(s) may be automatically aligned to cache line boundaries (block 1010). For example, in one implementation described above in connection with FIG. 4, device 110 (e.g., optimal cache generator 405) may automatically align the related section(s) of code to cache line boundaries based on program information 445 and/or cache/memory information 450. In one example, described above in connection with FIG. 8, optimal cache generator 405 may automatically align "DATA1" items adjacent to each other (e.g., at cache line boundaries), "DATA3" items adjacent to each other (e.g., at cache line boundaries), "PROGRAM1" items adjacent to each other (e.g., at cache line boundaries), and "PROGRAM3" items adjacent to each other (e.g., at cache line boundaries).

As further shown in FIG. 10, the related section(s) may be aligned to cache line boundaries of the cache based on user-specified program code and/or data sections (block 1020). For example, in one implementation, a user may specify related section(s) of program code and/or data of the code, and optimal cache generator 405 may align the related section(s) of code to cache line boundaries based on the user's specifications. In one example, described above in connection with FIG. 8, a user may specify that the "DATA1" items are related, and optimal cache generator 405 may align "DATA1" items adjacent to each other at cache line boundaries.

The related section(s) may be aligned to the cache line boundaries based on user-specified cache conditions (block 1030). For example, in one implementation, a user may specify one or more cache conditions (e.g., cache/memory information 450), and optimal cache generator 405 may align the related section(s) of code to cache line boundaries of the cache based on the user's specifications. In one example, described above in connection with FIG. 8, a user may specify that the "DATA1" items are to be stored in memory, and optimal cache generator 405 may align "DATA1" items adjacent to each other at cache line boundaries in memory.

As further shown in FIG. 10, the related section(s) may be aligned to the cache line boundaries based on a combination of the automatic alignment, the user-specified program code and/or data sections, and/or the user-specified cache conditions (block 1040). For example, in one implementation, optimal cache generator 405 may receive the user-specified program code and/or data sections and the user-specified cache conditions, and may automatically determine any optimal cache conditions omitted by the user-specified conditions. Optimal cache generator 405 may use this combination of information to align the related section(s) of code to cache line boundaries.

Figure 11A:
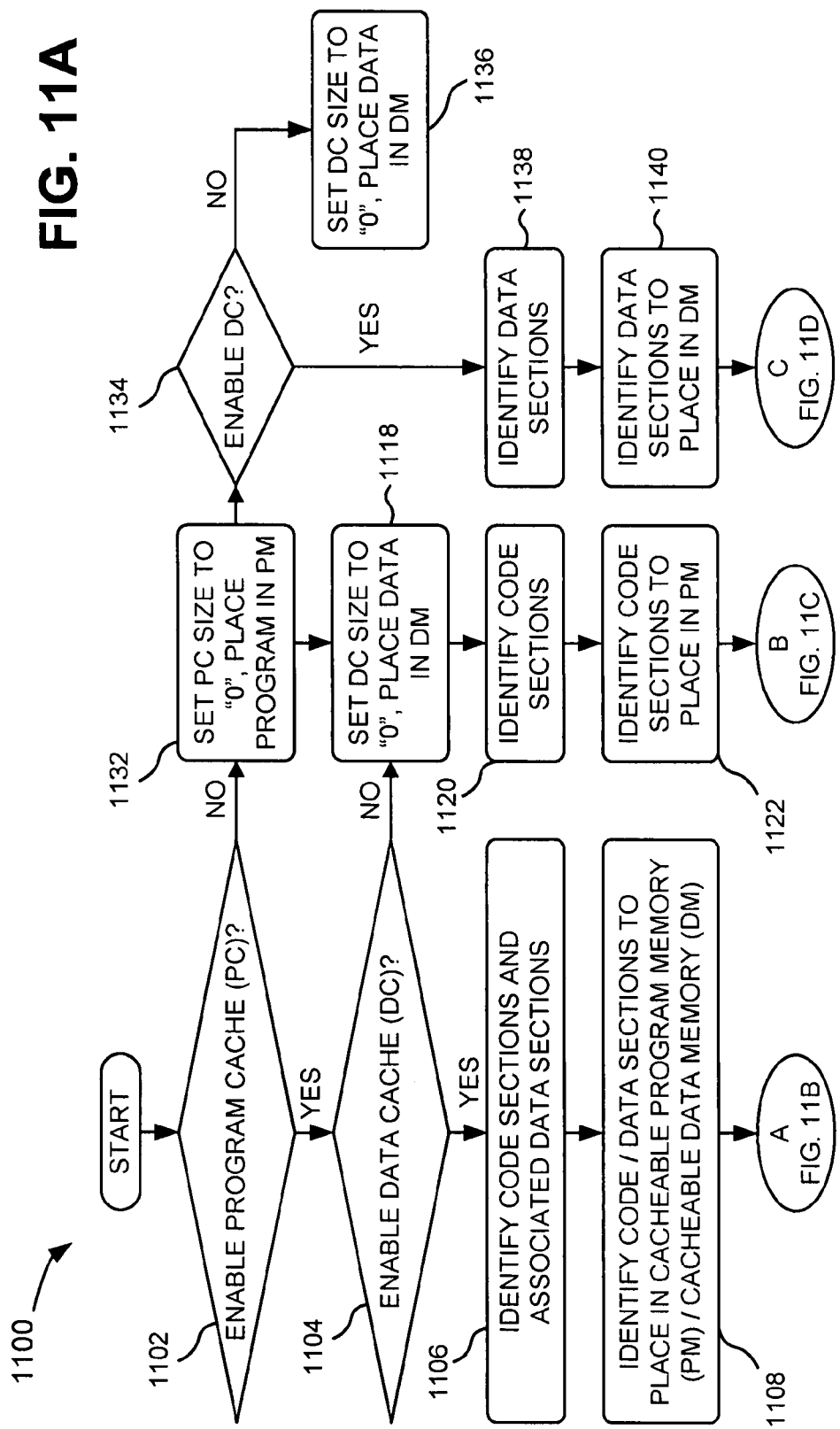

FIGS. 11A-11D depict an exemplary process 1100 according to an implementation described herein. As shown in FIG. 11A, process 1100 may begin with a determination of whether to enable program cache (block 1102). If the program cache is to be enabled (block 1102—YES), it may be determined whether data cache is to be enabled (block 1104). For example, in one implementation described above in connection with FIG. 5B, cache enabling logic 540 may receive program information 445 and/or cache/memory information 450, and may determine whether to enable cache. If cache is to be enabled, cache enabling logic 540 may determine how much of cacheable memory should be used for cache (for optimal cache performance) and how much should be used as a uniquely addressable memory, and/or may determine how much of cache may be allocated for program and/or data.

As further shown in FIG. 11A, if data cache is to be enabled (block 1104—YES), code sections and/or associated data sections may be identified (block 1106), and code sections and/or data sections may be identified for placement in cacheable program memory and/or cacheable data memory, respectively (block 1108). For example, in one implementation, cache optimization algorithms 550 may identify code sections and/or associated data sections, and/or may identify code sections and/or data sections that may be placed in cacheable program memory and/or cacheable data memory, respectively.

Figure 11B:
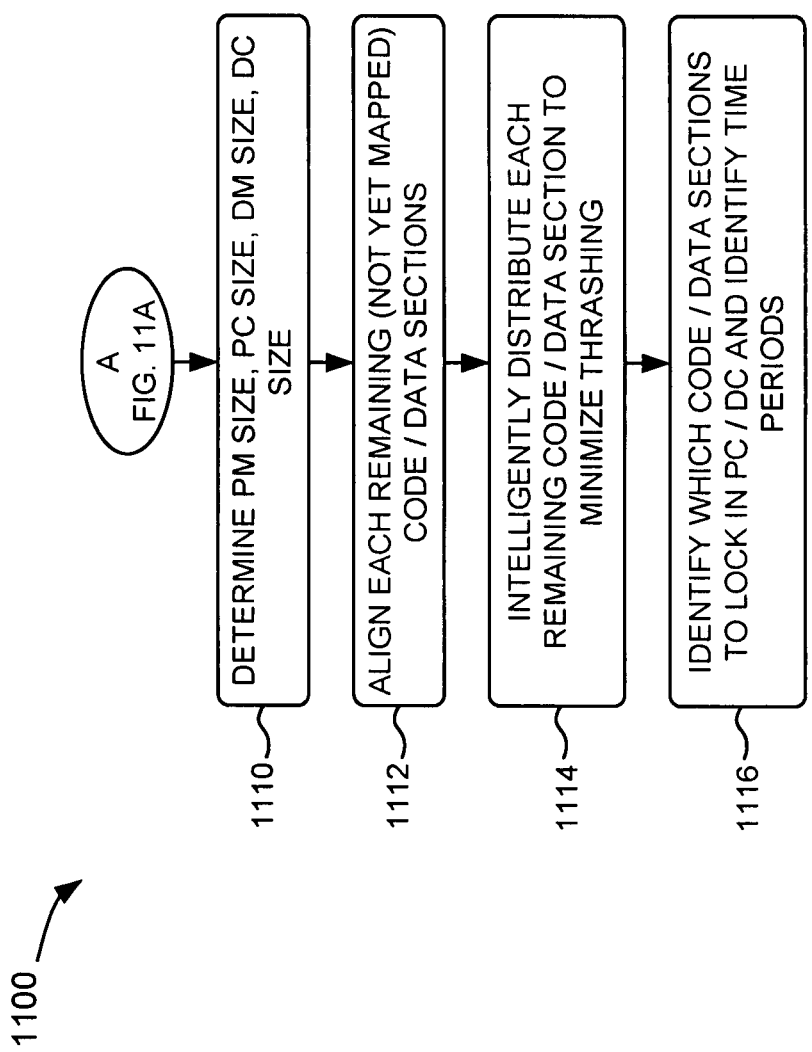

As shown in FIG. 11B, cache optimization algorithms 550 may also determine a cacheable program memory size, a program cache size, a cacheable data memory size, and/or a data cache size (block 1110), and/or may align any remaining (e.g., not yet mapped) code sections and/or data sections (block 1112). As further illustrated, cache optimization algorithms 550 may intelligently distribute each of the remaining code sections and/or data sections to minimize thrashing (block 1114), and/or may identify which code sections and/or data sections may be locked in program cache and/or data cache, respectively, as well as identify time periods (block 1116).

Returning to FIG. 11A, if cache enabling logic 540 determines that data cache is not to be enabled (block 1104—NO), cache optimization algorithms 550 may set the data cache size to zero and may place data in cacheable data memory (block 1118). Cache optimization algorithms 550 may further identify code sections (block 1120), and/or may identify code sections that may be placed in cacheable program memory (block 1122).

Figure 11C:
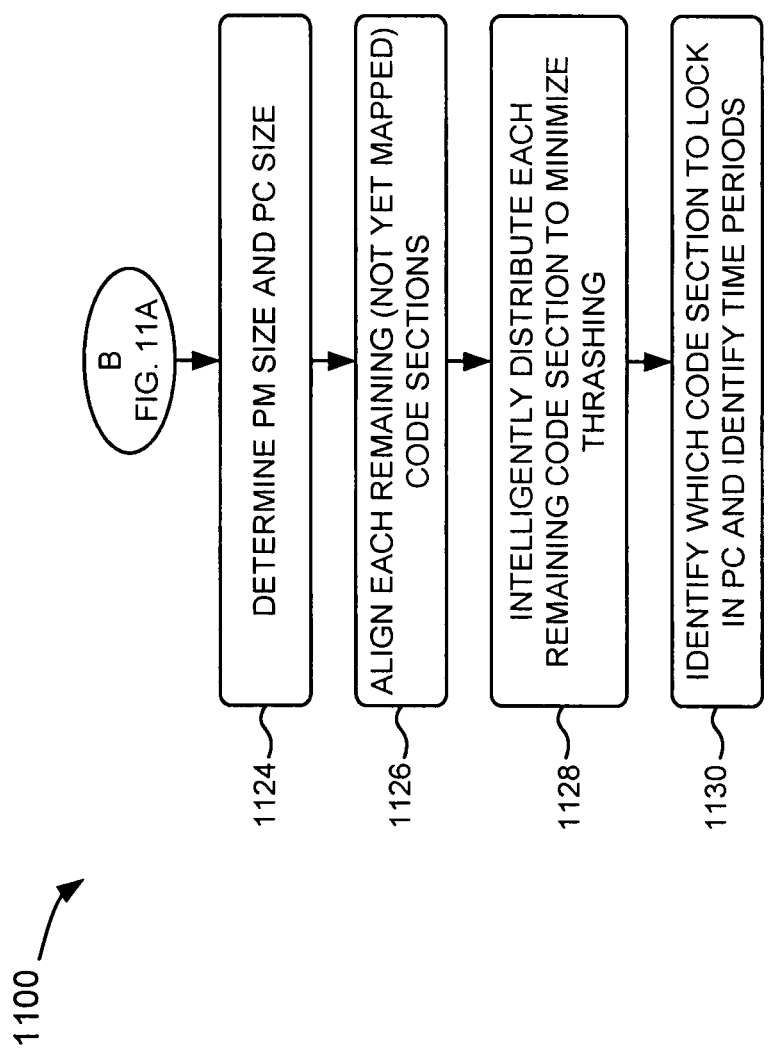

As shown in FIG. 11C, cache optimization algorithms 550 may also determine a cacheable program memory size and/or a program cache size (block 1124), and/or may align any remaining (e.g., not yet mapped) code sections (block 1126). As further illustrated, cache optimization algorithms 550 may intelligently distribute each of the remaining code sections to minimize thrashing (block 1128), and/or may identify which code sections may be locked in program cache and may identify time periods (block 1130).

Returning to FIG. 11A, if cache enabling logic 540 determines that program cache is not to be enabled (block 1102—NO), cache optimization algorithms 550 may set program cache size to zero and may place program in cacheable program memory (block 1132). If cache enabling logic 540 determines that data cache is not to be enabled (block 1134—NO), cache optimization algorithms 550 may set data cache size to zero and may place data in cacheable data memory (block 1136). If cache enabling logic 540 determines that data cache is to be enabled (block 1134—YES), cache optimization algorithms 550 may identify data sections (block 1138), and/or may identify data sections that may be place in cacheable data memory (block 1140).

As shown in FIG. 11D, cache optimization algorithms 550 may also determine a cacheable data memory size and/or a data cache size (block 1142), and/or may align any remaining (e.g., not yet mapped) data sections (block 1144). As further illustrated, cache optimization algorithms 550 may intelligently distribute each of the remaining data sections to minimize thrashing (block 1146), and/or may identify which data sections may be locked in data cache and may identify time periods (block 1148).

Figure 12A:
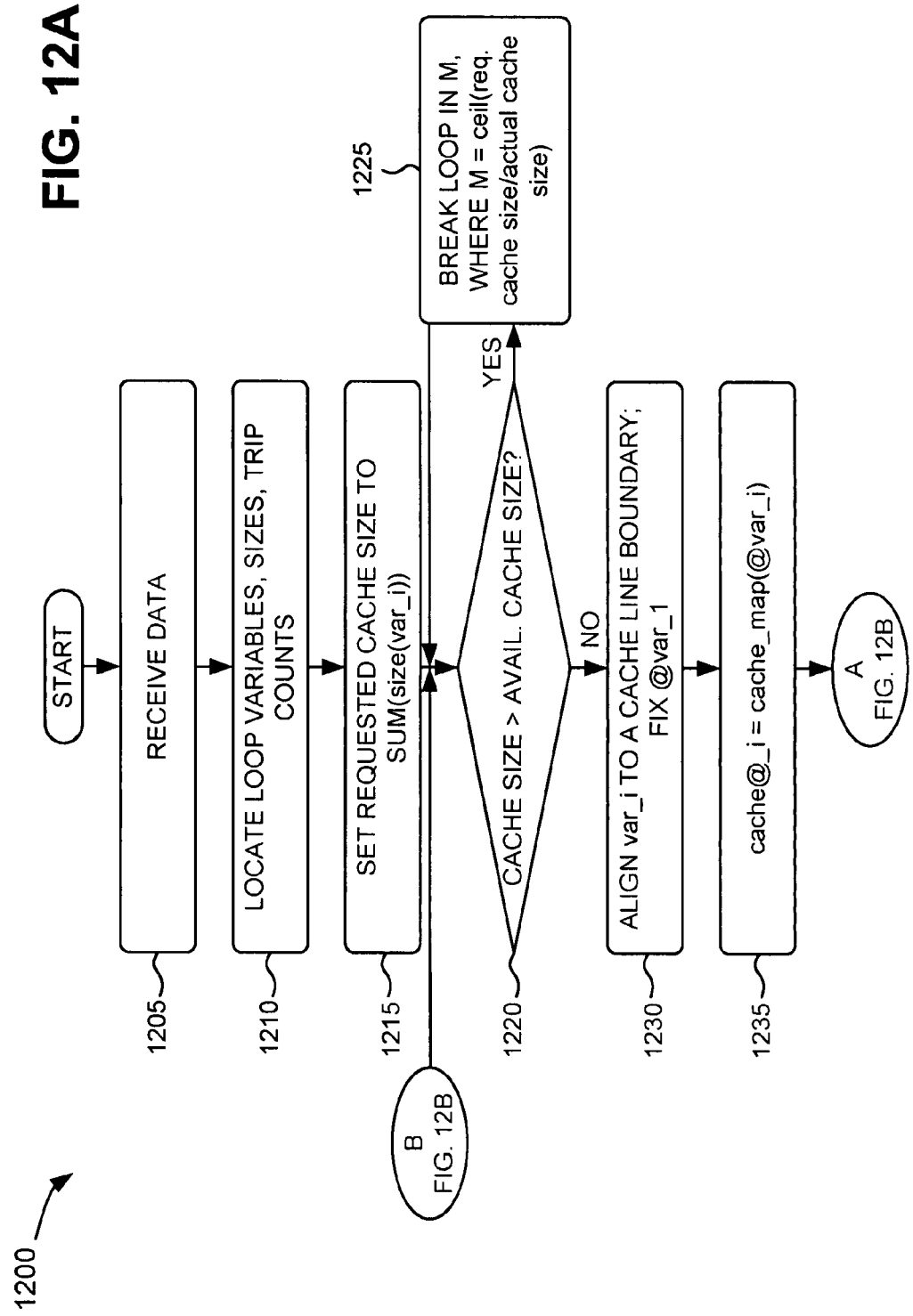
Figure 12B:
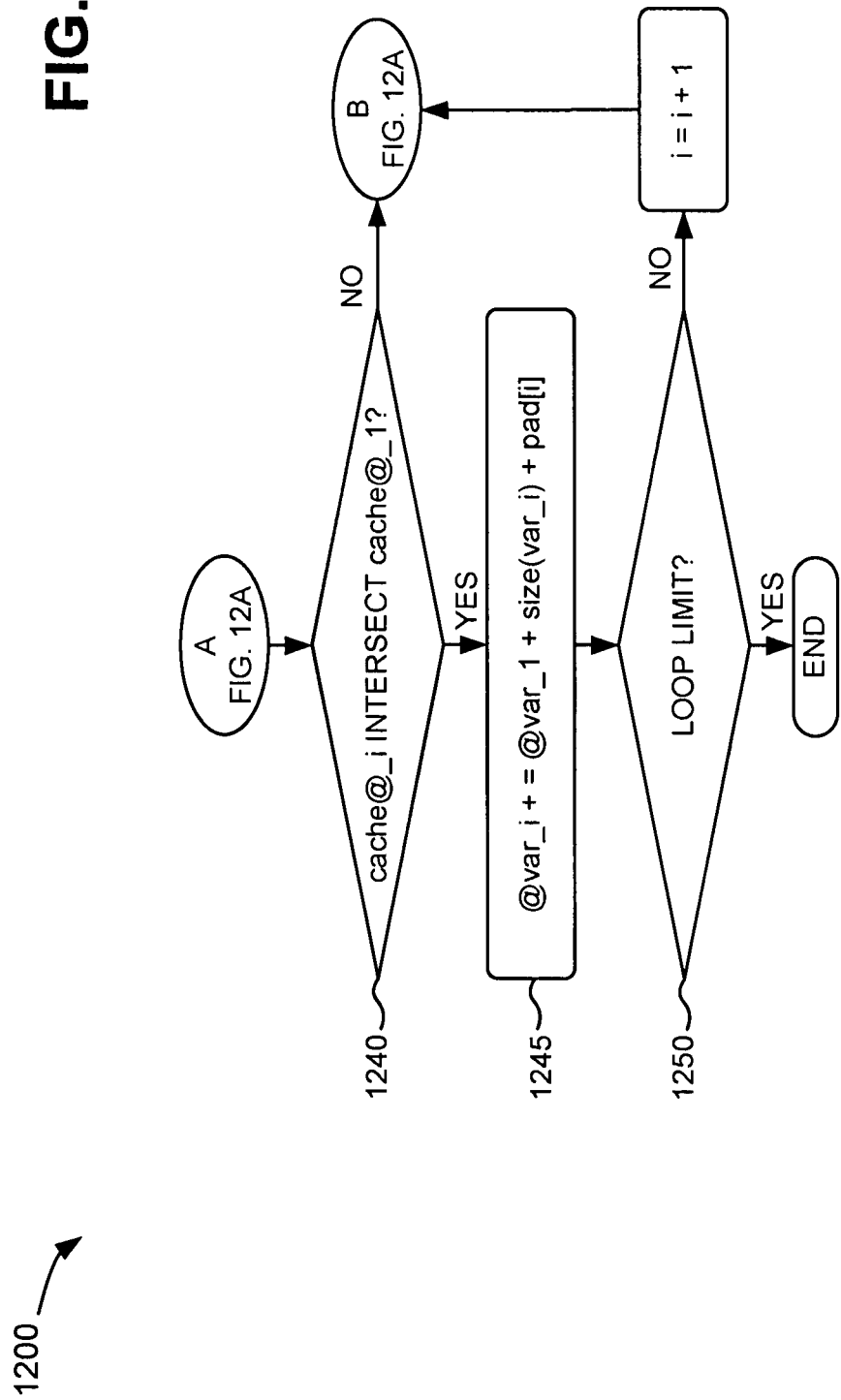

FIGS. 12A and 12B depict an exemplary process 1200 according to an implementation described herein. As shown in FIG. 12A, process 1200 may begin with receipt of data (block 1205), and location of loop variables, sizes, trip counts, etc. (block 1210). For example, in one implementation described above in connection with FIG. 4, optimal cache generator 405 may receive program information 445 and/or cache/memory information 450, and may locate information associated with the received information. In one example, cache/memory information 450 may include a description of attributes and physical layout of physical cache elements of a computational hardware device (e.g., a device implementing cache design 120), such as cacheable memory of one or more processors and/or any external memory elements accessed by one or more processors. In another example, cache/memory information 450 may include a number of levels of cache available (e.g., two levels if L1 and L2 cache are available), a cache size for each available cache (e.g., divided between program cache and data cache), a cache line size for each available cache, cache alignment of each block of program and/or each signal (e.g., data) between two blocks, trip count frequency (e.g., number of execution times of a block of program), and/or other cache conditions to invoke cache alignment.

As further shown in FIG. 12A, a cache size may be set to a size (e.g., $\Sigma size(var\_i)$, provided by IR files 510 and/or program information 445) (block 1215), and it may be determined if the cache size is greater than an available cache size (block 1220). If the set cache size is greater than the available cache size (block 1220—YES), then a loop may be broken into "M" pieces (e.g., where M=ceil(required cache size/actual cache size) (block 1225) and process 1200 may return to block 1220. For example, in one implementation, optimal cache generator 405 may set a cache size for the data based on the located loop variables, sizes, trip counts, etc., and may determine if the set cache size is greater than an available cache size (e.g., of cache design 120). If the cache size is greater than the available cache size, automatic code generator 405 may break the data into portions (e.g., "M" portions).

If the set cache size is not greater than the available cache size (block 1220—NO), then process 1200 may align data (e.g., "var_i") to a cache line boundary, and may fix data (e.g., "@var_1") (block 1230). For example, in one implementation described above in connection with FIG. 4, optimal cache generator 405 may use program information 445 and/or cache/memory information 450 to align individual program code and/or data sections of program 440 in order to achieve optimal effective cache memory access times (i.e., maximize cache hit likelihood). In another implementation, optimal cache generator 405 may lock preferred sections of program code and/or data in a cache for a period of time (e.g., a duration of frequent accesses).

As further shown in FIG. 12A, process 1200 may map a cache location (e.g., "cache@_i") to data (e.g., "cache_map (@var_i)") (block 1235). For example, in one implementation described above in connection with FIG. 8, optimal cache generator 405 may map data to data information 805 and/or may map program to program information 810.

Process 1200 may continue to block "A" of FIG. 12B. As shown in FIG. 12B, if "cache@_i" does not intersect with "cache@_1" (block 1240—NO), process 1200 may return to block "B" of FIG. 12A. If "cache@_i" intersects with "cache@_1" (block 1240—YES), process 1200 may calculate the following equation: "@var_i+=@var_1+size (var_i)+pad[i]" (block 1245). For example, in one implementation, optimal cache generator 405 may generate optimal cache management scheme 410 that may prevent cache thrashing (i.e., prevent different data from being placed in the same cache location).

As further shown in FIG. 12B, if a loop limit is attained (block 1250—YES), process 1200 may cease, otherwise (block 1250—NO) process 1200 may return to block "B" of FIG. 12A after a loop value (i) is incremented by one (e.g., "i=i+1").

FIG. 13 may depict an exemplary process 1300 for optimal sizing of cache. In implementation, process 1300 may determine whether any of cacheable program memory is to be used as program cache and, if so, how much of the cacheable program memory is to be allocated as program cache (with the remaining portion being allocated as program memory). As illustrated, process 1300 may begin with receipt of program information 445 (e.g., code size of combined interrupt handler and O/S kernel retrieved from the memory map file produced by target environment build tools 530), cache/memory information 450 (e.g., cacheable memory size for program), and/or IR files 510 (e.g., containing information about predicted interrupt handler and O/S kernel CPU times per execution and frequency of execution) (block 1310). Process 1300 may utilize such information to set program cache size to a total cacheable program memory size (TOT) (e.g., which equals a sum of program cache size and program memory size) and/or may set program memory size to zero (block 1320).

As further shown in FIG. 13, process 1300 may determine whether a predicted frequency of execution (FEX) of an interrupt handler and O/S kernel is less than a user-defined or automatically generated frequency threshold (THR) (block 1330). If the predicted frequency of execution (FEX) is less than the frequency threshold (THR) (block 1330—YES), process 1300 may cease. Otherwise (block 1330—NO), it may be determined if a code size (CS) of the interrupt handler and O/S kernel is less than the total cacheable program memory size (TOT) (block 1340). If the code size (CS) is less than the total cacheable program memory size (TOT) (block 1340—YES), process 1300 may set program memory size to the code size (CS) and may set program cache size to the total cacheable program memory size (TOT) less program memory size (block 1350). Otherwise (block 1340—NO), process 1300 may cease.

EXAMPLE

FIG. 14 is an exemplary diagram of a system 1400 according to implementations described herein. As illustrated, system 1400 may include a cache optimizer 1410, which may receive a user program 1420, user device information 1430, and/or user-specified conditions 1440, and may output a user program optimized for the user device 1450.

Cache optimizer 1410 may include a software application that determines optimized user program 1450 based on the received user program 1420, user device information 1430, and/or user-specified conditions 1440. In one implementation, cache optimizer 1410 may be included in a web service, as described above. In another implementation, cache optimizer 1410 may include a software application that may be downloaded (e.g., to a user device). In still another implementation, cache optimizer 1410 may include a software application that may be installed (e.g., on a user device).

User program 1420 may include any type of program, such as games, modeling programs, and/or any other type of program that may benefit from optimized performance based on the cache. Cache optimizer 1410 may be used for any of these types of user program 1420.

User device information 1430 may include any information related to the user device implementing user program 1420. For example, user device information 1430 may include may include any information described above in connection with cache/memory information 450.

User-specified conditions 1440 may include any user-specified information related to user program 1420 and/or user device information 1430. For example, user-specified conditions 1440 may include user-specified related section(s) of program code and/or data of user program 1420, and/or may include user-specified cache conditions of the user device.

Optimized user program 1450 may include a program that may be optimized for the user device executing optimized user program 1450. In one implementation, optimized user program 1450 may be configured based on optimal cache management scheme 410 described above in connection with FIG. 4. In another implementation, optimized user program 1450 may be configured based on optimized cache environment 190 described above in connection with FIG. 1.

Exemplary Optimization of Cache Configuration for Application Design

In a first implementation, FIGS. 15-20 depict techniques for determining parameters, attributes, specifications, etc., and/or for generating hardware description language (HDL) code that builds an efficient cache configuration for an application design or a class of application designs. The resulting cache configuration may be optimized (or tuned) for the application design. For example, an optimal cache configuration for one application design (e.g., an image processing application) may be different than an optimal cache configuration of another application design (e.g., a digital motor control application).

In a second implementation depicted in FIGS. 15-20, static (e.g., fixed) cache configurations may permit cache parameters and/or cache attributes to be dynamically set during execution. For example, such settings (e.g., cache parameters and/or cache attributes) may be determined at run time to optimize cache performance as the application design is executing in the cache environment.

A "cache configuration," as the term is used herein, is to be broadly interpreted to include any cache attribute that may be used to describe a cache system and associated cache schemes for a processor. For example, a cache configuration may include any of the following cache attributes: a size of cacheable memory for each level of cache (e.g., L1 cache sizes of 0.5 KB, 1 KB, or 2 KB, L2 cache sizes of 16 KB, 32 KB, or 64 KB, L3 cache sizes of 128 KB or 256 KB, etc.); a size of program cache for each level of cache (e.g., percent of cacheable memory, such as 25%, 50%, 75%, 100%, etc.); a size of data cache for each level of cache (e.g., percent of cacheable memory, such as 25%, 50%, 75%, 100%, etc.); a size of a cache line (e.g., 8 bytes, 16 bytes, 32 bytes, 64 bytes, 128 bytes, 256 bytes, 512 bytes, etc.); a cache line replacement policy (e.g., a line eviction policy, least-recently used policy, most-recently used policy, etc.); a write policy (e.g., when and how often to write data lines back to main memory, a write-through policy, writer-through on writes, write-back when evicted, etc.); a size of a write buffer (e.g., 8 bytes, 16 bytes, 32 bytes, 64 bytes, 128 bytes, etc.); associativity (e.g., fully associative, direct mapped, set associative, etc.); a number of levels of cache (e.g., one, two, three, etc. levels); cache/memory information 450; etc.

Implementations depicted in FIGS. 15-20 may determine information associated with the cache attributes such that cache performance may be optimized for a particular application design or a class of application designs (e.g., a Viterbi decoder, a MPEG-4 decoder, an array processing beamformer, an audio noise canceller, a digital motor controller, etc.) under constraints. Exemplary constraints may include a physical area (e.g., a gate count), a processor cost (e.g., cost due to circuit complexity), power consumption (e.g., type and/or length of battery life), heat dissipation, etc. Implementations depicted in FIGS. 15-20 may produce specifications for a optimizing a cache configuration, HDL code that may implement the cache configuration (e.g., either in an ASIC or a FPGA), and/or generated C language and/or assembly code that may dynamically set cache attributes during execution. The resulting outputs may be used to build a hardcore processor (e.g., a Pentium) and/or a softcore processor (e.g., a processor implemented in HDL code as reconfigurable logic (e.g., in an ASIC or a FPGA)), and/or may dynamically set cache parameters (e.g., cache ON/OFF switch, size of cache, size of a cache line, number of sets to associate, etc.).

Various permutations of the cache attributes may be used by optimization algorithms (e.g., optimization algorithms 550) that determine the cache configuration. In one example, the optimization algorithms may include algorithms that execute combinations of optimization settings via gradient, genetic, branch and bound, and/or other search techniques. In another example, the optimization algorithms may not require optimization parameters (e.g., a search space of cache attributes), but may provide cache attributes that may not be bounded a priori. The optimal cache configuration may be determined by static analysis and/or by trial-and-error (e.g., by executing generated code on a target cache configuration and measuring performance results). In one example, the cache configuration may be iteratively implemented by generating HDL code until an optimal is found. In another example, application code (e.g., which may dynamically set cache attributes) may be iteratively generated until an optimal cache performance is attained.

FIG. 15 is a diagram depicting exemplary operations of TCE 300. As illustrated, TCE 300 may include automatic code generator 400, block diagram model 415, target environment build tools 530, and/or optimization rules 455, which may include the features previously described for these components. As further shown in FIG. 15, TCE 300 may include an optimal cache configuration generator 1500 (e.g., that may receive IR files 1510 from automatic code generator 400 and/or may provide cache configuration settings 1520 to automatic code generator 400), cache attributes and/or attribute values 1530, cache attribute values for optimal cache configuration 1540, HDL cache code 1550, application code 1560, and/or cache performance results 1570.

Optimal cache configuration generator 1500 may receive optimization rules 455, IR files 1510, cache attributes/attribute values 1530, and/or cache performance results 1560, may generate cache configuration settings 1520 based on the received information, in one implementation, and/or may generate cache attribute values for optimal cache configuration 1540 and/or HDL cache code 1550 based the received information, in another implementation. Further details of optimal cache configuration generator 1500 are provided below in connection with FIG. 17.

IR files 1510 may include IR files that may be translated into application code (e.g., via programming language emitter 520). IR files 1510 may convey information capable of being conveyed by application code, and/or a cache configuration may be optimized for application code via examination of corresponding IR files 1510.

Cache configuration settings 1520 may include any cache parameters and/or cache attributes to be dynamically set during execution (e.g., of application code 1560). For example, cache configuration settings 1520 settings (e.g., cache parameters and/or cache attributes) may be determined at run time to optimize cache performance as the application design is executing in the cache environment.

Cache attributes/attribute values 1530 may include any cache attribute (and/or attribute values) that may be used to describe a cache system and associated cache schemes for a processor. For example, a cache attributes/attribute values may include a size of cacheable memory for each level of cache (e.g., L1 cache sizes of 0.5 KB, 1 KB, or 2 KB, L2 cache sizes of 16 KB, 32 KB, or 64 KB, L3 cache sizes of 128 KB or 256 KB, etc.); a size of program cache for each level of cache (e.g., percent of cacheable memory, such as 25%, 50%, 75%, 100%, etc.); a size of data cache for each level of cache (e.g., percent of cacheable memory, such as 25%, 50%, 75%, 100%, etc.); a size of a cache line (e.g., 8 bytes, 16 bytes, 32 bytes, 64 bytes, 128 bytes, 256 bytes, 512 bytes, etc.); a cache line replacement policy (e.g., a line eviction policy, least-recently used policy, most-recently used policy, etc.); a write policy (e.g., when and how often to write data lines back to main memory, a write-through policy, writer-through on writes, write-back when evicted, etc.); a size of a write buffer (e.g., 8 bytes, 16 bytes, 32 bytes, 64 bytes, 128 bytes, etc.); associativity (e.g., fully associative, direct mapped, set associative, etc.); a number of levels of cache (e.g., one, two, three, etc. levels); cache/memory information 450; etc.

Cache attribute values for optimal cache configuration 1540 may include any cache attributes/attribute values 1530 determined for the optimal cache configuration (e.g., as determined by optimal cache configuration generator 1500).

HDL cache code 1550 may include any HDL code that may implement the optimal cache configuration (e.g., either in an ASIC or a FPGA), any HDL code that may build an efficient cache configuration for an application design or a class of application designs, etc.

Application code 1560 may include any code for an application design (e.g., an image processing application, a digital motor control application, a Viterbi decoder, a MPEG-4 decoder, an array processing beamformer, an audio noise canceller, a digital motor controller, etc.) under consideration, any C language and/or assembly code that may dynamically set cache attributes during execution, etc.

Cache performance results 1570 may include any information resulting from execution of HDL cache code 1550 and/or application code 1560 by target environment build tools 530, any information relating to cache performance, etc. Alternatively, and/or additionally, the generated application code (e.g., application code 1560) may be executed directly in an HDL environment, and/or test vectors that (e.g., that may mimic execution of the generated application code in terms of cache interactions) may be run the through the HDL environment to produce execution performance metrics (e.g., cache performance results 1570).

In an exemplary operation, automatic code generator 400 may receive block diagram model 415 and/or cache configuration settings 1520, and/or may generate IR files 1510 and/or application code 1560 based on block diagram model 415. Optimal cache configuration generator 1500 may receive optimization rules 455, IR files 1510, and/or cache attributes/attribute values 1530, and/or may determine an optimal cache configuration based on the received information. Optimal cache configuration generator 1500 may generate a target cache environment with HDL cache code 1550, and/or may output specifications (e.g., cache attribute values for optimal cache configuration 1540) for building the optimal cache configuration. TCE 300 may execute application code 1560 in the target cache environment (e.g., via target environment build tools 530), and/or may generate cache performance results 1570 based on the execution of application code 1560. Cache performance results 1570 may be provided to optimal cache configuration generator 1500 for determination of the optimal cache configuration.

Although FIG. 15 shows exemplary components of TCE 300, in other implementations, TCE 300 may include fewer, different, or additional components than depicted in FIG. 15. In still other implementations, one or more components of TCE 300 may perform some or all of the tasks described as being performed by one or more other components of TCE 300.

FIG. 16 is a diagram depicting exemplary operations of automatic code generator 400. As illustrated, automatic code generator 400 may include a variety of components, such as model translator 500, intermediate representation (IR) files 510, and/or programming language emitter 520. Model translator 500, IR files 510, and/or programming language emitter 520 may include the features described above in connection with FIG. 5A.

As further shown in FIG. 16, model translator 500 may receive block diagram model 415, and/or may generate IR files 510 based on block diagram model 415. For example, model translator 500 may translate block diagram model 415 into IR files 510. IR files 510 may receive cache configuration settings 1520, and/or may generate IR files 1510 based on cache configuration settings 1520. Programming language emitter 520 may receive IR files 510, and/or may generate application 1560 based on the received IR files 510. Application code 1560 and/or HDL cache code 1550 may be input to target environment build tools 530 for execution. Target environment build tools 530 may execute application code 1560 and/or HDL cache code 1550, and/or may generate cache performance results 1570 based on the execution.

Although FIG. 16 shows exemplary components of automatic code generator 400, in other implementations, automatic code generator 400 may include fewer, different, or additional components than depicted in FIG. 16. In still other implementations, one or more components of automatic code generator 400 may perform some or all of the tasks described as being performed by one or more other components of automatic code generator 400.

Figure 17:
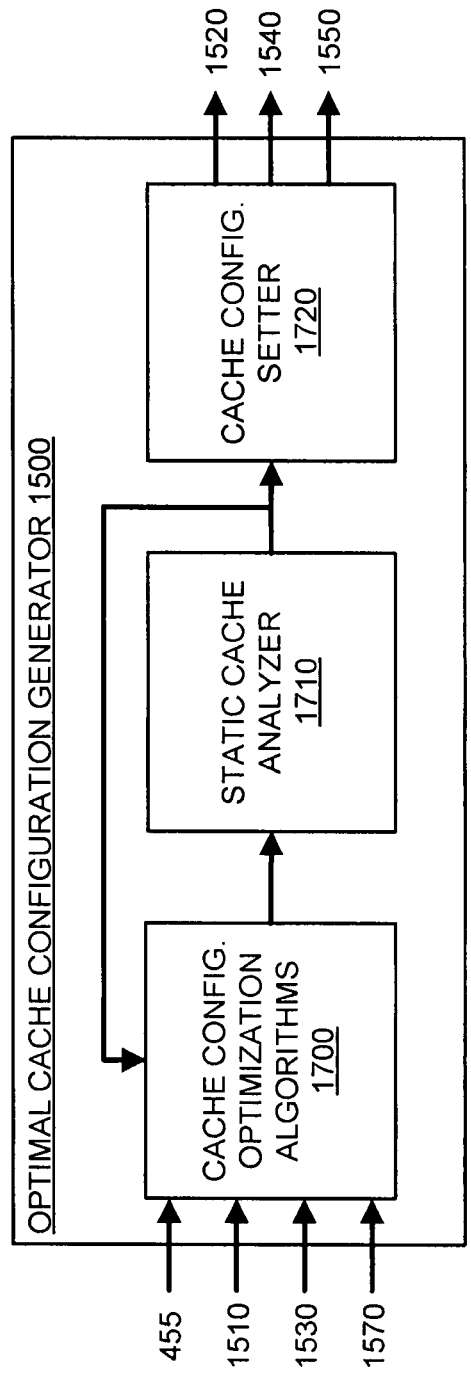
FIG. 17 is a diagram depicting exemplary operations of the optimal cache configuration generator illustrated in FIG. 4.

FIG. 17 is a diagram depicting exemplary operations of optimal cache configuration generator 1500. As illustrated, optimal cache configuration generator 1500 may include a variety of components, such as cache configuration optimization algorithms 1700, a static cache analyzer 1710, and/or a cache configuration setter 1720.

Cache configuration optimization algorithms 1700 may receive optimization rules 455, IR files 1510, cache attributes/attribute values 1530, and/or cache performance results 1570, and/or may determine an optimal cache configuration based on the received information. In one implementation, cache configuration optimization algorithms 1700 may include algorithms that execute combinations of optimization settings via gradient, genetic, branch and bound, and/or other search techniques. In another implementation, cache configuration optimization algorithms 1700 may not require optimization parameters (e.g., a search space of cache attributes), but may provide cache attributes that may not be bounded a priori. The optimal cache configuration may be determined by static analysis and/or by trial-and-error (e.g., by executing generated code on a target cache configuration and measuring performance results). In one example, the cache configuration may be iteratively implemented by generating HDL code until an optimal is found. In another example, application code (e.g., which may dynamically set cache attributes) may be iteratively generated until an optimal cache performance is attained. Cache configuration optimization algorithms 1700 may provide the optimal cache configuration to static cache analyzer 1710.

Static cache analyzer 1710 may receive the optimal cache configuration, may perform a static analysis based on the received optimal cache configuration, and/or may collect static cache performance results based on the static analysis. Static cache analyzer 1710 may provide the static cache performance results to cache configuration optimization algorithms 1700 and/or cache configuration setter 1720.

Cache configuration setter 1720 may receive the static cache performance results, and/or may generate cache configuration settings 1520, cache attribute values for optimal cache configuration 1540, and/or HDL cache code 1550 based on the received static cache performance results.

Although FIG. 17 shows exemplary components of optimal cache configuration generator 1500, in other implementations, optimal cache configuration generator 1500 may include fewer, different, or additional components than depicted in FIG. 17. In still other implementations, one or more components of optimal cache configuration generator 1500 may perform some or all of the tasks described as being performed by one or more other components of optimal cache configuration generator 1500.

Figure 18:
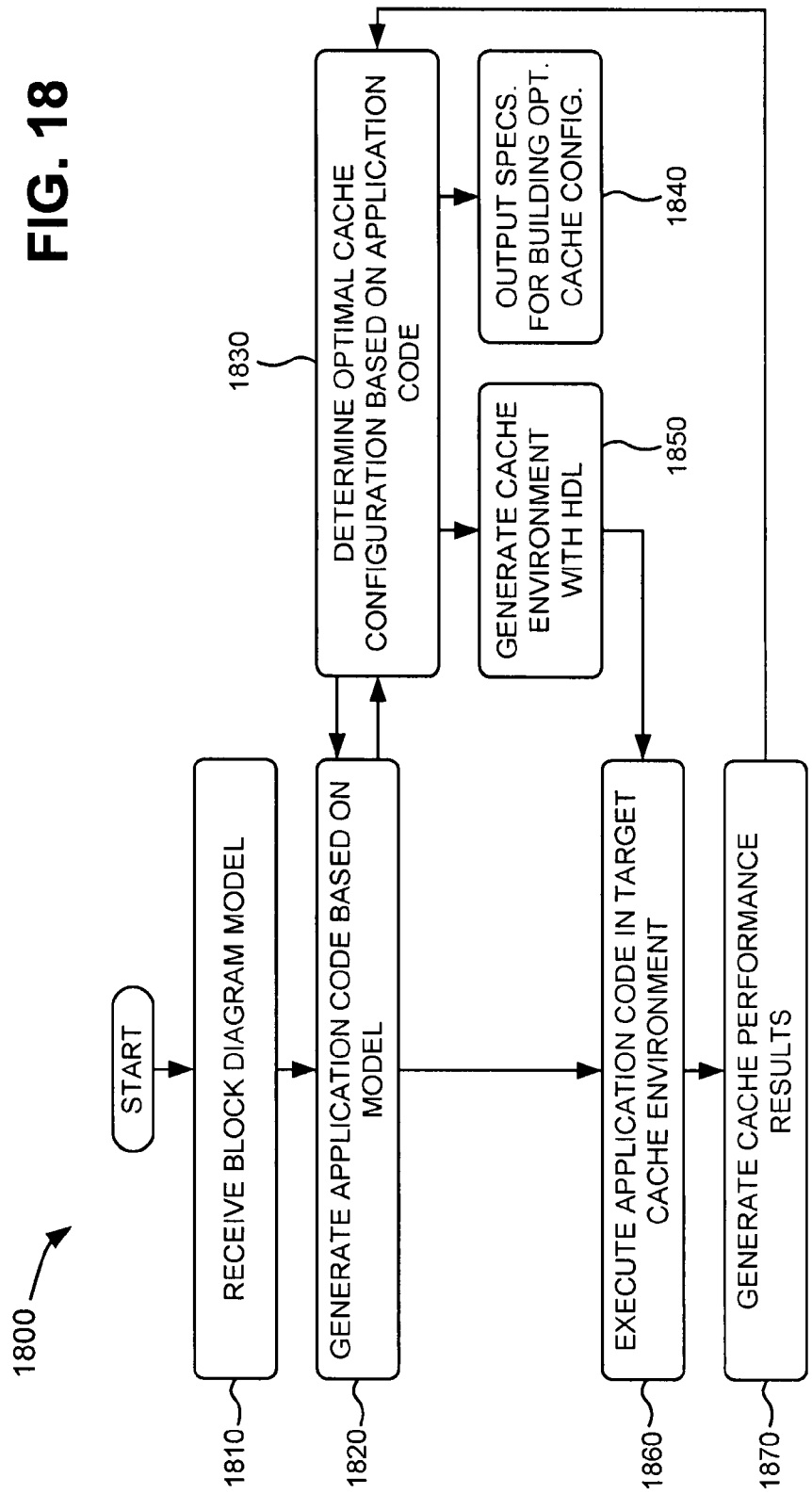
FIGS. 18-20 depict flow charts of exemplary processes according to implementations described herein.
Figure 19:
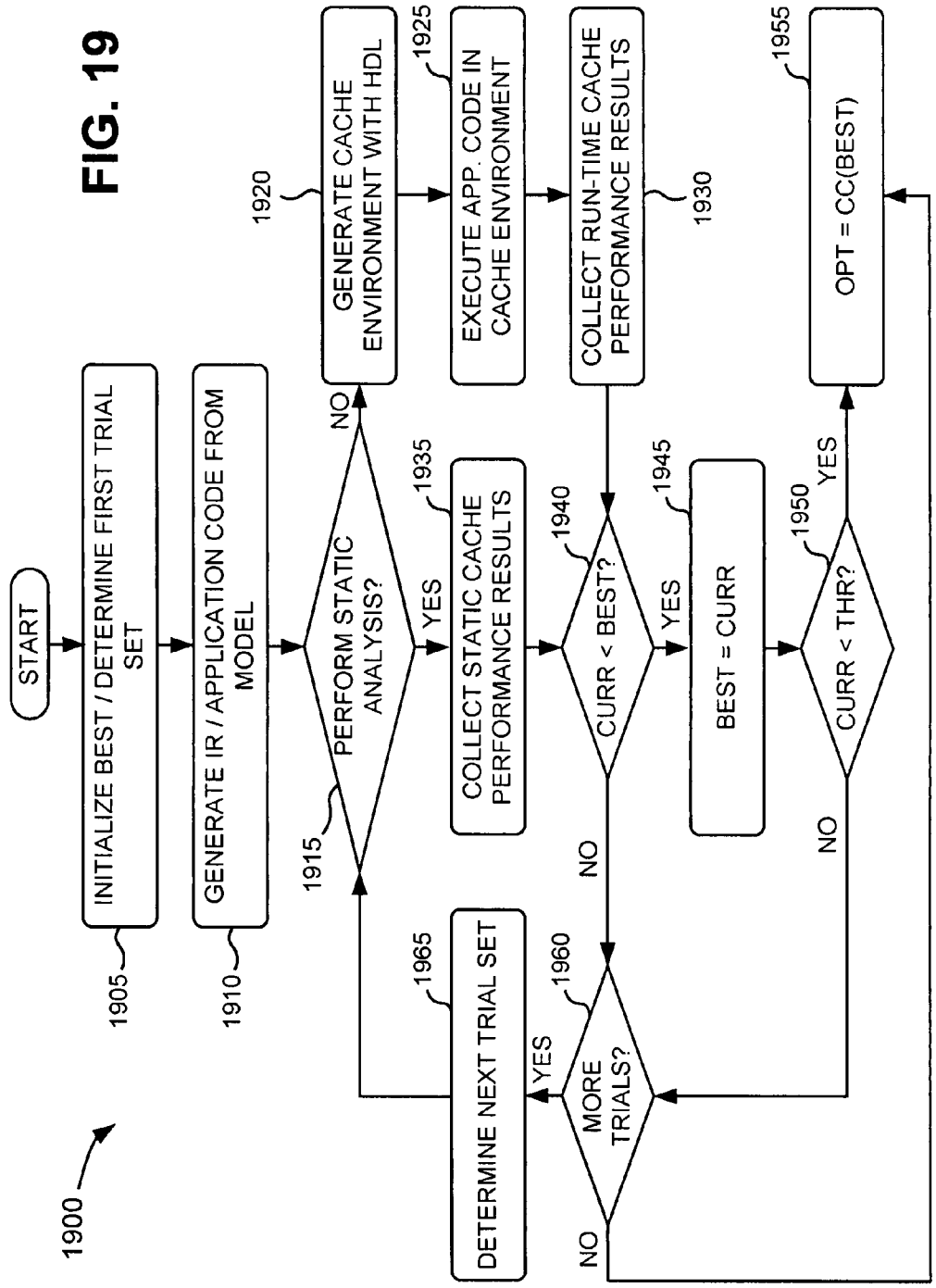
Figure 20:
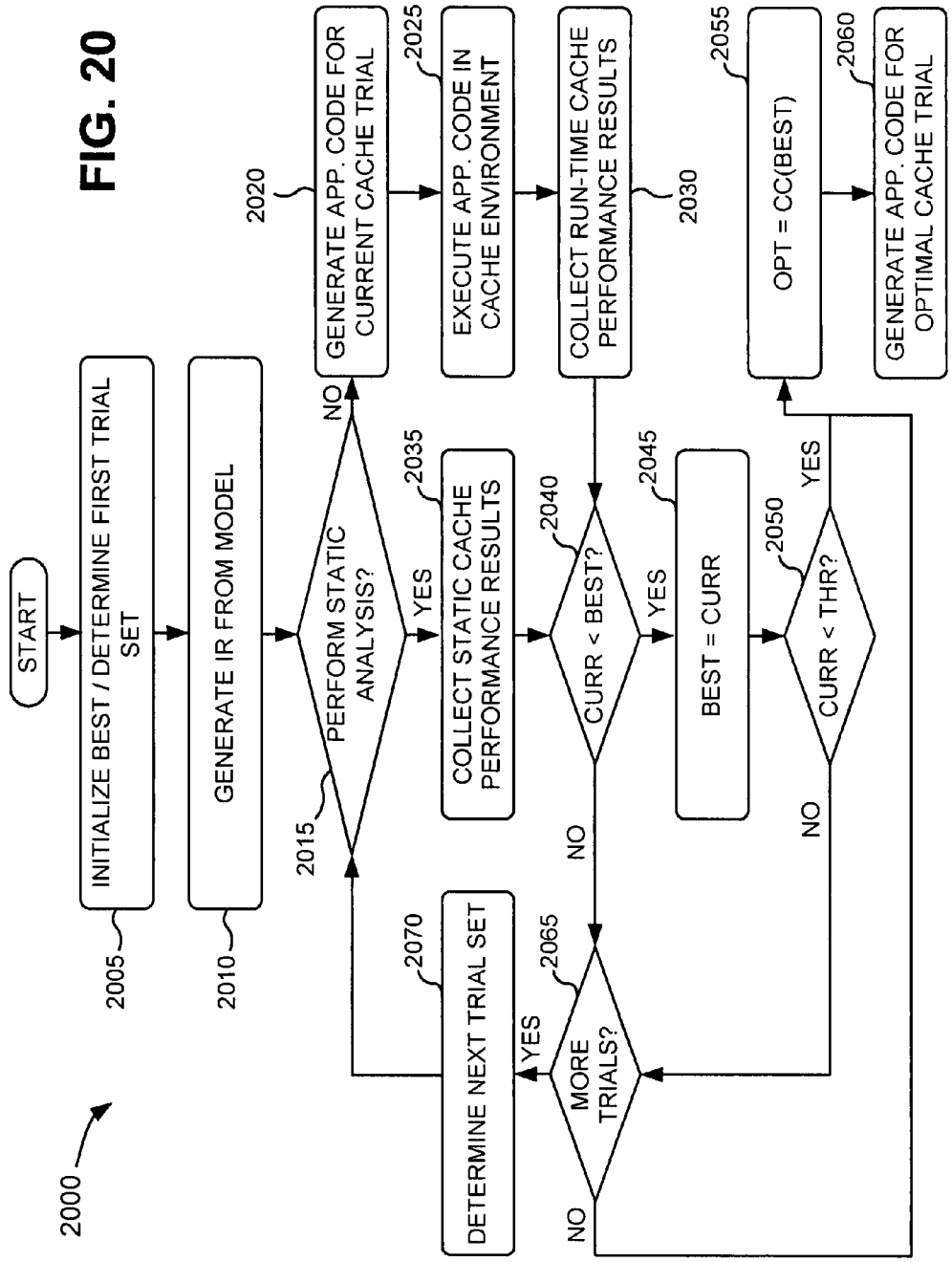

FIGS. 18-20 depict flow charts of exemplary processes according to implementations described herein. The processes of FIGS. 18-20 may be performed by one or more software and/or hardware components within device 110. Alternatively, the processes may be performed by one or more software and/or hardware components within another device or a group of devices separate from or including device 110.

FIG. 18 depicts a process 1800 according to the first implementation and the second implementation described above. In the first implementation, process 1800 may include techniques for determining parameters, attributes, specifications, etc., and/or generating hardware description language (HDL) code for building an efficient cache configuration for an application design or a class of application designs. In the second implementation, process 1800 may permit cache parameters and/or attributes, associated with static cache configurations, to be dynamically set during execution.

As shown in FIG. 18, process 1800 may begin with receipt of a block diagram model (block 1810), and/or generation of application code based on the received block diagram model (block 1820). For example, in one implementation described above in connection with FIG. 15, automatic code generator 400 may receive block diagram model 415 and/or cache configuration settings 1520, and/or may generate IR files 1510 and/or application code 1560 based on block diagram model 415.

Returning to FIG. 18, an optimal cache configuration may be determined based on the application code and may be returned to block 1820 for regeneration of the application code (block 1830), specifications for building the optimal cache configuration may be output (block 1840), and/or a target cache environment may be generated with HDL code (block 1850). For example, in one implementation described above in connection with FIG. 15, optimal cache configuration generator 1500 may receive optimization rules 455, IR files 1510, and/or cache attributes/attribute values 1530, and/ or may determine an optimal cache configuration based on IR files 1510. Optimal cache configuration generator 1500 may generate a target cache environment with HDL cache code 1550, and/or may output specifications (e.g., cache attribute values for optimal cache configuration 1540) for building the optimal cache configuration. In the first implementation, the target cache environment may be implemented with the generated HDL code. In the second implementation, the target cache environment may include a cache system of a physical processor.

As further shown in FIG. 18, the application code may be executed in the target cache environment (block 1860), and/or one or more cache performance results may be generated and process 1800 may return to block 1830 (block 1870). For example, in one implementation described above in connection with FIG. 15, TCE 300 may execute application code 1560 in the target cache environment (e.g., via target environment build tools 530), and/or may generate cache performance results 1570 based on the execution of application code 1560.

FIG. 19 depicts a process 1900 according to the first implementation described above in connection with FIG. 18. Process 1900 may begin with initialization of a performance of a best cache configuration trial (BEST, which may represent an execution time of the best cache configuration trial) and determination of a first trial set (block 1905), and/or generation of an intermediate representation (IR) and/or application code from a model (block 1910). For example, in one implementation, optimal cache configuration generator 1500 may initialize a performance of a best cache configuration to a value (e.g., infinity) and may determine a trial set of cache attributes and/or attribute values 1530. Automatic code generator 400 may generate IR files 510 and/or IR files 1510 based on block diagram model 415.

As further shown in FIG. 19, if a static analysis is not performed (block 1915—NO), a cache environment may be generated with HDL code (block 1920), application code may be executed in the cache environment (block 1925), and/or run-time cache performance results may be collected (block 1930). For example, in one implementation, if optimal cache configuration generator 1500 determines that a static analysis is not to be performed, optimal cache configuration generator 1500 may generate a cache environment with HDL cache code 1550. Target environment build tools 530 may execute application code 1560 to produce cache performance results 1570 (e.g., an execution load graph, a timing diagram, a cache hit percentage, an average access time, etc.), and cache performance results 1570 may be collected by optimal cache configuration generator 1500.

Returning to FIG. 19, if a static analysis is performed (block 1915—YES), static cache performance results may be collected (block 1935), and/or it may be determined if performance (e.g., execution time, where a lower execution time indicates a better performance) of a cache configuration trial (CURR) is less than the performance of the best cache configuration trial (BEST, e.g., a faster execution time) (block 1940). For example, in one implementation, optimal cache configuration generator 1500 may perform a static analysis of IR files 1510 (e.g., with static analyzer 1710) with an algorithm or by simulating execution of application code 1560 in a cache environment, and/or may collect static cache performance results. Optimal cache configuration generator 1500 may determine if performance of a current cache configuration trial is less, in terms of execution time, than the performance of a best cache configuration trial.

As shown in FIG. 19, if the performance of the cache configuration trial (CURR) is less than the performance of the best configuration trial (BEST) (block 1940—YES), the performance of the best cache configuration trial (BEST) may set equal to the performance of the cache configuration trial (CURR) (block 1945), and/or it may be determined if the performance (e.g., execution time, where a lower execution time indicates a better performance) of the cache configuration trial (CURR) is less than a threshold (THR) (block 1950). For example, in one implementation, if optimal cache configuration generator 1500 determines that performance of the current cache configuration trial is less than the performance of the best cache configuration trial, optimal cache configuration generator 1500 may set the performance of the current cache configuration trial equal to the performance of the best cache configuration trial. Optimal cache configuration generator 1500 may determine if performance of a current cache configuration trial is less, in terms of execution time, than a threshold (e.g., a threshold value or values indicating an optimal cache configuration and/or faster execution times).

Returning to FIG. 19, if the performance of the cache configuration trial (CURR) is less than the threshold (THR) (block 1950—YES), a cache configuration corresponding to an optimal cache environment trial (OPT) may be set equal to a cache configuration corresponding to a best cache environment trial (CC(BEST)) (block 1955). For example, in one implementation, if optimal cache configuration generator 1500 determines that performance of the current cache configuration trial is less than the threshold (THR), optimal cache configuration generator 1500 may set a cache configuration corresponding to an optimal cache environment trial equal to a cache configuration corresponding to a best cache environment trial (e.g., cache attributes with attribute values, HDL code of the cache configuration, etc.).

As further shown in FIG. 19, if the performance of the cache configuration trial (CURR) is greater than or equal to the performance of the best configuration trial (BEST) (block 1940—NO) or greater than or equal to the threshold (THR) (block 1950—NO), it may be determined if there are more trials (block 1960). If there are more trials (block 1960—YES), a next trial set may be determined (block 1965) and process 1900 may continue to block 1915. Otherwise (block 1960—NO), process 1900 may proceed to block 1955. For example, in one implementation, if optimal cache configuration generator 1500 determines that performance of the current cache configuration trial is greater than or equal to the threshold and/or the performance of the best cache configuration trial, optimal cache configuration generator 1500 may determine if more trials remain. If more trials remain, optimal cache configuration generator 1500 may determine the next trial set of cache attributes. Otherwise, optimal cache configuration generator 1500 may generate cache configuration settings 1520, cache attribute values for optimal cache configuration 1540, and/or HDL cache code 1550.

FIG. 20 depicts a process 2000 according to the second implementation described above in connection with FIG. 18. Process 2000 may begin with initialization of a performance of a best cache configuration trial (BEST) and determination of a first trial set (block 2005), and/or generation of an intermediate representation (IR) from a model (block 2010). For example, in one implementation, optimal cache configuration generator 1500 may initialize a performance of a best cache configuration to a value (e.g., infinity) and may determine a trial set of cache attributes and/or attribute values 1530. Automatic code generator 400 may generate IR files 510 based on block diagram model 415.

As further shown in FIG. 20, if a static analysis is not performed (block 2015—NO), application code may be generated for a current cache trial (block 2020), the application code may be executed in a cache environment (block 2025), and/or run-time cache performance results may be collected (block 2030). For example, in one implementation, if optimal cache configuration generator 1500 determines that a static analysis is not to be performed, optimal cache configuration generator 1500 may generate IR files 1510. Target environment build tools 530 may execute application code 1560 to produce cache performance results 1570 (e.g., an execution load graph, a timing diagram, a cache hit percentage, an average access time, etc.), and cache performance results 1570 may be collected by optimal cache configuration generator 1500.

Returning to FIG. 20, if a static analysis is performed (block 2015—YES), static cache performance results may be collected (block 2035), and/or it may be determined if performance (e.g., execution time, where a lower execution time indicates a better performance) of a cache configuration trial (CURR) is less than the performance of the best cache configuration trial (BEST, e.g., a faster execution time) (block 2040). For example, in one implementation, optimal cache configuration generator 1500 may perform a static analysis of IR files 1510 (e.g., with static analyzer 1710) with an algorithm or by simulating execution of application code 1560 in a cache environment, and/or may collect static cache performance results. Optimal cache configuration generator 1500 may determine if performance of a current cache configuration trial is less, in terms of execution time, than the performance of a best cache configuration trial.

As shown in FIG. 20, if the performance of the cache configuration trial (CURR) is less than the performance of the best configuration trial (BEST) (block 2040—YES), the performance of the best cache configuration trial (BEST) may set equal to the performance of the cache configuration trial (CURR) (block 2045), and/or it may be determined if the performance of the cache configuration trial (CURR) is less than a threshold (THR) (block 2050). For example, in one implementation, if optimal cache configuration generator 1500 determines that performance of the current cache configuration trial is less than the performance of the best cache configuration trial, optimal cache configuration generator 1500 may set the performance of the current cache configuration trial equal to the performance of the best cache configuration trial. Optimal cache configuration generator 1500 may determine if performance of a current cache configuration trial is less, in terms of execution time, than a threshold (e.g., a threshold value or values indicating an optimal cache configuration).

Returning to FIG. 20, if the performance of the cache configuration trial (CURR) is less than the threshold (THR) (block 2050—YES), a cache configuration corresponding to an optimal cache environment trial (OPT) may be set equal to a cache configuration corresponding to a best cache environment trial (CC(BEST)) (block 2055) and/or application code for the optimal cache trial may be generated (block 2060). For example, in one implementation, if optimal cache configuration generator 1500 determines that performance of the current cache configuration trial is less than the threshold (THR), optimal cache configuration generator 1500 may set a cache configuration corresponding to an optimal cache environment trial equal to a cache configuration corresponding to a best cache environment trial (e.g., cache attributes with attribute values, HDL code of the cache configuration, etc.), and/or automatic code generator 400 may generate IR files 1510 for the optimal cache environment trial.

As further shown in FIG. 20, if the performance of the cache configuration trial (CURR) is greater than or equal to the performance of the best configuration trial (BEST) (block 2040—NO) or greater than or equal to the threshold (THR) (block 2050—NO), it may be determined if there are more trials (block 2065). If there are more trials (block 2065—YES), a next trial set may be determined (block 2070) and process 2000 may continue to block 2015. Otherwise (block 2065—NO), process 2000 may proceed to block 2055. For example, in one implementation, if optimal cache configuration generator 1500 determines that performance of the current cache configuration trial is greater than or equal to the threshold and/or the performance of the best cache configuration trial, optimal cache configuration generator 1500 may determine if more trials remain. If more trials remain, optimal cache configuration generator 1500 may determine the next trial set of cache attributes. Otherwise, optimal cache configuration generator 1500 may generate cache configuration settings 1520 and/or cache attribute values for optimal cache configuration 1540, and/or automatic code generator 400 may generate application code 1560.

An exemplary embodiment of the first implementation, described above in connection with FIGS. 15-20, may include optimizing sizes of L1 cache and/or L2 cache for an application design. For example, a cache configuration may be designed for a softcore processor and/or a hardcore processor, and data cache performance may be optimized for a particular application under certain cost and/or area constraints (e.g., gate count). The exemplary application design may apply an edge detection algorithm (e.g., that may include filtering and thresholding) to stream images of "320" by "240" pixels (e.g., a single 8-bit byte per pixel). It may be assumed that a cost of implementing L1 and/or L2 data caches of various sizes is as follows:

L1 Data Cache: 4 KB, 8 KB, 16 KB Cost(L1, L1size) =L1size*A0+A1

L2 Data Cache: 32 KB, 64 KB, 128 KB Cost(L2, L2size) =L2size*B0+B1 where A0=10×B0, A1=4×B1, A0 and B0 are in dollars ($) per KB of cache, and A1 and B1 are in dollars ($). As shown by the cost equations, the cost of L1 cache may be more expensive than the cost of L2 cache of the same size because of the much higher clock speed required for L1 cache.

It may be assumed that a design objective is to keep the cost under $200 while attaining the best execution performance for the edge detection-based application. Table 1 shows costs for various sizes of L1 and L2 caches, calculated from the equations given above with B0=$1 per Kb and B1=$20.

TABLE 1

| L1 size/L2 size | 0 KB | 4 KB | 8 KB | 16 KB |
| --- | --- | --- | --- | --- |
| 0 KB | 0 | 120 | 140 | 180 |
| 32 KB | 132 | 152 | 172 | 212 |
| 64 KB | 164 | 184 | 204 | 244 |
| 128 KB | 228 | 248 | 268 | 308 |

For each L1/L2 combination that is within the cost budget (e.g., less than $200), a static analysis may be conducted, and/or generated application code may be iteratively executed (or the execution may be simulated) in a generated HDL environment for each L1/L2 combination that are within budget. The generated application code may be executed directly in the HDL environment, and/or test vectors that mimic the generated application code in terms of cache interactions may be executed through the HDL environment to produce execution performance metrics (e.g., data cache hit rate, average data access time, application execution time, etc.). The HDL environment may include an HDL simulator (e.g., Mentor Graphics ModelSim, Cadence Incisive), a FPGA, and/or an ASIC implementing the synthesized HDL.

By static analysis and/or iterative generation of HDL that implements cache configurations, the performance metrics for each cache configuration may be determined for the edge detection-based application. Table 2 shows application execution performance results (or predicted application execution performance results) for each L1/L2 configuration executing the edge detection algorithm per image.

TABLE 2

| L1 size/L2 size | 0 KB | 4 KB | 8 KB | 16 KB |
|---|---|---|---|---|
| 0 KB | 44.61 ms | 18.50 ms | 18.48 ms | 18.44 ms |
| 32 KB | 32.83 ms | 10.87 ms | 10.86 ms | 10.86 ms |
| 64 KB | 32.79 ms | 10.85 ms | 10.86 ms | 10.84 ms |
| 128 KB | 32.79 ms | 10.85 ms | 10.84 ms | 10.84 ms |

Of the L1/L2 configurations that are within budget, Table 2 shows the following three configurations that yield similar performance results, but may be better than the other L1/L2 combinations:

| Configuration 1 | Configuration 2 | Configuration 3 |
|---|---|---|
| L1: 4 KB | L1: 4 KB | L1: 8 KB |
| L2: 32 KB | L2: 64 KB | L2: 32 KB |
| Perf: 10.87 ms | Perf: 10.85 ms | Perf: 10.86 ms |
| Cost: $152 | Cost: $184 | Cost: $172 |

While configuration 2 may include a slightly better performance than configurations 1 and 3, configuration 2 may not be selected if the most cost-effective cache configuration is desired because the performance is only slightly better than configuration 1 while cost may be significantly more ($184−$152=$32 difference). User-provided optimization rules may be modified to select cost-effective options as opposed to a best performance configuration that is within budget.

This example may be applicable to the second implementation, described above in connection with FIGS. 15-20, if the targeted cache configuration permits dynamic setting of L1 cache size and L2 cache size, and the dynamic setting of cache attributes improves application execution performance.

An exemplary embodiment of the second implementation, described above in connection with FIGS. 15-20, may include dynamic setting of cache size and associativity (e.g., adjusted during execution by generated application code). The application code may be targeted for execution on a digital signal processor (DSP) that includes 256 KB of internal on-chip memory of which up to 64 KB may be configured as cache (when not configured as cache, this memory may be configured as addressable memory (or RAM)). Cache size may be varied from 0 KB to 64 KB in 16 KB increments. Each 16 KB of cache may add one more way or set to the cache associativity (e.g., if the cache is configured as 16 KB it may operate as a direct mapped cache). If configured as 32 KB, 48 KB, or 64 KB, the cache may become a 2-way set associative cache, a 3-way set associative cache, or a 4-way set associative cache, respectively.

An exemplary application may include three tasks (e.g., TASK A, TASK B, and TASK C). It may be assumed that all three tasks are executed equally and frequently, and each task accesses every element of its respective and separate data sets multiple times per task invocation. It may further be assumed that TASK A includes a data size of 118 KB, TASK B includes a data size of 96 KB, and TASK C includes a data size of 240 KB. A search space of cache configuration trials may be provided by a user (e.g., via optimization rules) or may determined by an optimization algorithm. For this example, the search space may be as follows:

Trial set 1: 0 KB cache, 256 KB internal memory
   a) TASK A, TASK B in internal memory; TASK C in external memory
   b) TASK C in internal memory; TASK A and TASK B in external memory Trial set 2: various dynamic increments between 16 KB-64 KB of cache, various dynamic (256—cache size) KB internal memory
   a) TASK A in internal memory; TASK C and TASK B in external memory
   b) TASK B in internal memory; TASK C and TASK A in external memory Trial set 3: dynamic 0 KB/64 KB cache, dynamic 256 KB/192 KB internal memory
   a) TASK A in internal memory; 0 KB cache when overlaying TASK B into internal memory; 64 KB cache for TASK C execution
   b) TASK B in internal memory; 0 KB cache when overlaying TASK A into internal memory; 64 KB cache for TASK C execution Trial set 1 may represent static (or fixed) cache configurations, and the configurations of trial sets 1 and 2 may represent dynamic cache configurations where the cache attributes (e.g., cache size and associativity) may be set and changed during execution of generated application code.

Based on static analysis of execution performance, repeated generation of the application code, setting cache attributes according to the search space, and/or execution on a target processor (e.g., cache environment), an optimal trial (i.e., cache settings corresponding to the best execution performance) may be determined. For this example, trial set 3a may be determined to be the optimal trial. Trial set 3a may place TASK A data (118 KB) into internal memory, and if TASK B is ready to run, may set cache size to 0 KB and copy (or overlay) TASK B data (96 KB) to internal memory for TASK B execution. If TASK B completes, TASK B data may be returned (or saved) to its original location in external memory, and the cache size may be set to the maximum value for TASK C execution. The generated application code may repeat this sequence until the application is terminated.

The pseudo code for Trial set 3a may include the following syntax:
  enable cache
  while forever
    execute TASK A
    set cache to 0 KB
    copy external TASK B data to internal memory
    execute TASK B
    copy internal TASK B data back to external memory
    set cache size to 64 KB
    execute TASK C
  end while.

The corresponding generated application code may include the following syntax:

```
//---------main routine---------
void main( )
{
    //Enable cache
```

-continued

```
CACHE_enableCaching(CACHE_EMIFA_CE00);
    while (1)
    {
        //Execute TASK A
        process TASK_A(intTASK_A);
        // Set cache size to 0KB for TASK B. Cacheable memory to
        // be used as RAM by TASK B.
        CACHE_setL2Mode(CACHE_0KCACHE);
        // Restore TASK B state (data) from external memory
// to internal memory
        copy1D(extTASK_B, intTASK_B, STATE_SZ);
        // Execute TASK B
        process TASK_B(intTASK_B);
        // Save TASK B state (data) from internal memory
        // to external memory
        copy1D(intTASK_B, extTASK_B, STATE_SZ);
        // Set cache size to 64KB as required by TASK C
        CACHE_setL2Mode(CACHE_64KCACHE);
        // Execute TASK C
        process TASK_C(extTASK_C);
    }
    return;
}.
```

CONCLUSION

Implementations described herein may automatically optimize cache for program code and/or data of a software application in terms of cache hits to improve execution performance of the software application.

The foregoing description of implementations provides illustration and description, but is not intended to be exhaustive or to limit the invention to the precise form disclosed. Modifications and variations are possible in light of the above teachings or may be acquired from practice of the invention.

While a series of acts has been described with regard to FIGS. 9-12, the order of the acts may be modified in other implementations. Further, non-dependent acts may be performed in parallel.

It will be apparent that aspects, as described above, may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that one would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in the this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable memory device that stores instructions, the instructions comprising:
    one or more instructions that, when executed by a processor, cause the processor to:
        receive cache conditions and data of a software application;
        determine related sections of code of the software application;
        receive an input,
            the input specifying:
                one or more particular related sections of code of the software application, and
                specific cache conditions;
        determine a cache management scheme based on the cache conditions;
        align the determined related sections of the code and the particular related sections of the code based on the cache management scheme to create aligned code;
        group that aligned code into one or more first sections;
        distribute the grouped code into one or more second sections in a memory;
        receive information regarding a section of the one or more second sections,
            the information being based on:
                a size of the section, and
                a frequency of access of the section; and
        lock, based on the received information, the section in a cache for a particular period of time.

2. The non-transitory computer-readable memory device of claim 1, where the one or more instructions that cause the processor to align the determined related sections of the code and the particular related sections of the code further comprise:
    one or more instructions that, when executed by the processor, cause the processor to:
        automatically align the determined related sections of the code and the particular related sections of the code to cache line boundaries.

3. The non-transitory computer-readable memory device of claim 1, where the one or more instructions that cause the processor to align the determined related sections of the code and the particular related sections of the code further comprise:
    one or more instructions that, when executed by the processor, cause the processor to:
        automatically align the determined related sections of the code and the particular related sections of the code to cache line boundaries based on a user-specified program or data section.

4. The non-transitory computer-readable memory device of claim 1, where the one or more instructions that cause the processor to align the determined related sections of the code and the particular related sections of the code further comprise:
    one or more instructions that, when executed by the processor, cause the processor to:
        automatically align the determined related sections of the code and the particular related sections of the code to cache line boundaries based on at least one of:
            one or more user-specified cache conditions, or
            a combination of one or more user-specified cache conditions and a user-specified program or data section.

5. The non-transitory computer-readable memory device of claim 1, where the cache conditions include at least one of:
  a number of levels of cache available,
  a cache size for each available cache,
  a cache line size for each available cache,
  a cache alignment of each block of code or data,
  a trip count frequency, or
  a cache replacement policy, and
  where the data of the software application includes at least one of:
   related portions of the code and the data of the software application,
   most frequently used portions of the code and the data of the software application, or
   user-specified preferred portions of the code and the data.

6. The non-transitory computer-readable memory device of claim 1, where the one or more instructions that cause the processor to align the determined related sections of the code and the particular related sections of the code include:
  one or more instructions that, when executed by the processor, cause the processor to:
   align the determined related sections of the code and the particular related sections of the code as part of a multiple level cache management scheme.

7. A system comprising:
  a device, including a processor, to:
   receive software information, cache information, and optimization rules,
    the software information comprising related sections of code or data of a program,
   receive an input,
    the input specifying:
     particular related sections of the code or the data of the program, and
     particular cache conditions,
   generate a cache management scheme based on:
    the cache information, and
    the optimization rules,
   align the related sections of the code and the particular related sections of the code based on the cache management scheme to create aligned code;
   group that aligned code into one or more first sections;
   distribute the grouped code into one or more second sections in a memory;
   receive information regarding a section of the one or more second sections,
    the information being based on:
     a size of the section, and
     a frequency of access of the section; and
   lock, based on the received information, the section in a cache for a particular period of time.

8. The system of claim 7, where the cache information comprises at least one of:
  a description of attributes and physical layout of physical cache elements of a computational hardware device,
  information describing a type of memory used for cache,
  an access type and a speed of each type of memory,
  a size of each type of memory,
  a number of levels of cache available,
  a cache size for each available cache,
  a cache line size for each available cache,
  a cache alignment of each block of program,
  a trip count frequency, or
  a cache replacement policy.

9. The system of claim 7, where the optimization rules comprise at least one of:
  information regarding one or more software components,
  information regarding one or more modules, or
  information regarding one or more libraries configured with optimization algorithms.

10. The system of claim 7, where the optimization rules provide a heuristic approach to generate the cache management scheme.

11. The system of claim 7, where the device is further to:
  receive one or more files associated with a block diagram model, and
  generate particular code based on the cache management scheme and the received one or more files.

12. The system of claim 11, where the device is further to:
  receive input data structures associated with the block diagram model; and
  output information associated with the program, based on the cache management scheme, the block diagram model, and the input data structures,
   the output information including at least one of:
    one or more source code files,
    one or more linker files, or
    one or more object code.

13. The system of claim 12, where
  the particular code comprises a compiled and executable form of the source code files provided as a sequence of processor-readable instructions, or
  the input data structures comprise at least one of:
   templates,
   commands,
   input parameters,
   configuration data,
   source code, or
   data and class definitions used by an automatic code generator.

14. The system of claim 11, where the block diagram model comprises a design or an algorithm provided by a technical computing environment.

15. The system of claim 11, where the device is further to:
  generate one or more intermediate representations based on the cache management scheme and the block diagram model; and
  generate the particular code based on the one or more intermediate representations.

16. A method comprising:
  receiving cache conditions and data of a software application,
   the receiving being performed by a computing device;
  determining related sections of code of the software application,
   the determining being performed by the computing device;
  receiving an input,
   the input specifying:
    one or more particular related sections of code of the software application, and
    specific cache conditions, and
   the receiving the input being performed by the computing device;
  determining a cache management scheme based on the cache conditions,
   the determining the cache management scheme being performed by the computing device;
  aligning the determined related sections of the code and the particular related sections of the code based on the cache management scheme to create aligned code, the aligning being performed by the computing device;

grouping that aligned code into one or more first sections, the grouping being performed by the computing device;

distributing the grouped code into one or more second sections in a memory, the distributing being performed by the computing device;

receiving information regarding a section of the one or more second sections, the information being based on:

a size of the section, and a frequency of access of the section, and the receiving the information being performed by the computing device; and locking, based on the received information, the section in a cache for a particular period of time, the locking being performed by the computing device.

17. The method of claim 16, where, when aligning the determined related sections of the code and the particular related sections of the code, the method includes:

automatically aligning the determined related sections of the code and the particular related sections of the code to cache line boundaries.

18. The method of claim 16, where, when aligning the determined related sections of the code and the particular related sections of the code, the method includes:

automatically aligning the determined related sections of the code and the particular related sections of the code as part of a multiple level cache management scheme.

19. A device comprising:

a memory to store instructions; and a processor to execute the instructions to:

receive software information, cache information, and optimization rules, the software information comprising related sections of code or data of a program, receive an input, the input specifying:

particular related sections of the code or the data of the program, and particular cache conditions, generate a cache management scheme based on:

the cache information, and the optimization rules, align the related sections of the code and the particular related sections of the code based on the cache management scheme to create aligned code;

group that aligned code into one or more first sections;

distribute the grouped code into one or more second sections in a memory;

receive information regarding a section of the one or more second sections, the information being based on:

a size of the section, and a frequency of access of the section; and lock, based on the received information, the section in a cache for a particular period of time.

20. The device of claim 19, where the processor is further to:

receive one or more files associated with a block diagram model, and generate particular code based on the cache management scheme and the received one or more files.

21. The device of claim 20, where the processor is further to:

receive input data structures associated with the block diagram model; and output information associated with the program, based on the cache management scheme, the block diagram model, and the input data structures, the output information including at least one of:

one or more source code files, one or more linker files, or one or more object code.

22. The device of claim 20, where the processor is further to:

generate one or more intermediate representations based on the cache management scheme and the block diagram model; and generate the particular code based on the one or more intermediate representations.

\* \* \* \* \*